United States Patent
Dugan et al.

(10) Patent No.: US 9,329,966 B2
(45) Date of Patent: May 3, 2016

(54) FACILITATING USER SUPPORT OF ELECTRONIC DEVICES USING MATRIX CODES

(75) Inventors: Michael T. Dugan, Parker, CO (US); Mark H. Gomez, Parker, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 13/192,287

(22) Filed: Jul. 27, 2011

(65) Prior Publication Data

US 2012/0131416 A1 May 24, 2012

Related U.S. Application Data

(63) Continuation-in-part of application No. 12/953,227, filed on Nov. 23, 2010.

(51) Int. Cl.
  *G06F 17/00* (2006.01)
  *G06F 11/32* (2006.01)

(52) U.S. Cl.
  CPC ...................................... *G06F 11/32* (2013.01)

(58) Field of Classification Search
  USPC .............................. 235/375; 714/760, E11.03
  See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |

(Continued)

FOREIGN PATENT DOCUMENTS

| | | |
|---|---|---|
| CA | 2 634 951 A1 | 1/2010 |
| CN | 1352765 A | 6/2002 |

(Continued)

OTHER PUBLICATIONS

"Android App Reviews & Showcase Just a Tapp Away," Android Tapp, 10pp. Found online at http://www.androidtapp.com/download-the-weather-channel-android-app-from-your-tv/, Oct. 22, 2010.

(Continued)

*Primary Examiner* — Rafferty Kelly
(74) *Attorney, Agent, or Firm* — Kilpatrick Townsend & Stockton LLP

(57) ABSTRACT

An electronic device detects occurrence of an error condition and selects a matrix code to include in an error message to transmit to a display device based on the error condition. A reader device decodes the displayed matrix code to present information regarding resolution of the error condition. The electronic device may select the matrix code by looking up the error condition in a table or by dynamically generate the matrix code. In various implementations, the electronic device may determine that the information regarding resolution of the error condition has been utilized to unsuccessfully resolve the error condition. If so, the electronic device may select and transmit and additional matrix code that may be decoded by the reader device to access and present an additional set of information regarding resolution of the error condition or to initiate an electronic device support request.

19 Claims, 21 Drawing Sheets

(56) References Cited

U.S. PATENT DOCUMENTS

| | | |
|---|---|---|
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1* | 8/2005 | Andrew et al. ............... 400/703 |
| 2005/0203854 A1 | 9/2005 | Das |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernethy et al. |
| 2007/0174198 A1 | 7/2007 | Kasahara |
| 2007/0192723 A1 | 8/2007 | Anzelde et al. |
| 2007/0200335 A1 | 8/2007 | Tushcel |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1* | 1/2009 | Hogyoku ...................... 725/104 |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |

(56) References Cited

U.S. PATENT DOCUMENTS

| | | |
|---|---|---|
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0234570 A1 | 9/2009 | Sever |
| 2009/0254954 A1 | 10/2009 | Jeong |
| 2009/0293110 A1 | 11/2009 | Koga |
| 2009/0294538 A1 | 12/2009 | Wihlborg et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Nobuyoshi |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghiradi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 101 227 581 A | 7/2008 |
| CN | 101253504 A | 8/2008 |
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| TW | 299433 | 3/1997 |
| TW | 200915193 A | 4/2009 |
| TW | 200926075 A | 6/2009 |
| TW | 201032139 A | 1/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |

(56) References Cited

FOREIGN PATENT DOCUMENTS

| WO | 2007/009005 A1 | 1/2007 |
|---|---|---|
| WO | 2009/057651 A1 | 5/2009 |
| WO | 2009/116954 A2 | 9/2009 |
| WO | 2009/144536 A1 | 12/2009 |
| WO | 2010/149161 | 12/2010 |
| WO | 2011/009055 A2 | 1/2011 |

OTHER PUBLICATIONS

"Can Mobile Barcodes Work on TV?," India and Asia Pacific Mobile Industry Reports, Sep. 2009, 4 pp. Found online at http://gomonews.com/can-mobile-barcodes-work-on-tv/, Oct. 22, 2010.

"Fox TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.

"Fox's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Byford, D., "Universal Interactive Device," International Business Machines Corporation, Jun. 1998, 1 page.

Costedio, K., "Bluefly QR Codes Debut on TV," 2 pp. Found online at http://www.barcode.com/Mobile-Barcode-news/bluefly-qr-codes-debut-on-tv.html, Oct. 22, 2010.

Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60094 mailed on Mar. 30, 2012, 7 pages.

International Search Report and Written Opinion of PCT/US11/60104 mailed on Mar. 29, 2012, 9 pages.

International Search Report of PCT/US11/60109 mailed on Feb. 14, 2012, 3 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

International Search Report and Written Opinion of PCT/US11/64709 mailed on Apr. 10, 2012, 8 pages.

International Search Report and Written Opinion of PCT/US2011/060098 mailed on Mar. 29, 2012, 10 pages.

International Search Report and Written Opinion of PCT/US2011/063308 mailed on Mar. 29, 2012, 10 pages.

International Search Report and Written Opinion of PCT/US2011/068161 mailed on Jun. 14, 2012, 19 pages.

International Search Report and Written Opinion of PCT/US2011/068176 mailed on Mar. 29, 2012, 15 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.

Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.

Schmitz, A., et al., " Ad-Hoc Multi-Displays for Mobile Interactive Applications," 31st Annual Conference of the European Association for Computer Graphics (Eurographics 2010), May 2010, vol. 29, No. 2, 8 pages.

Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Smith, L., "QR Barcodes Make History on Global TV," 3 pp. Found online at http://lindsaysmith.com/worlds-first-mobio-mini-telethon/, Oct. 22, 2010.

Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/971,349, filed Dec. 17, 2010, Office Action mailed Jul. 16, 2012, 11 pages.

U.S. Appl. No. 12/984,385, filed Jan. 4, 2011, Office Action mailed Jul. 12, 2012, 16 pages.

U.S. Appl. No. 12/986,721, filed Jan. 7, 2011, Office Action mailed Mar. 16, 2012, 6 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

Extended European Search Report for EP 12152690.9 dated Jun. 19, 2012, 9 pages.

International Search Report and Written Opinion of PCT/US2012/026624 mailed Aug. 29, 2012, 14 pages.

(56) References Cited

OTHER PUBLICATIONS

U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011, Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 12/984,385, filed Jan. 4, 2011, Notice of Allowance mailed Nov. 28, 2012, 11 pages.
U.S. Appl. No. 13/037,312, filed Feb. 28, 2011, Office Action mailed Aug. 15, 2012, 9 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed December 29, 2010, Office Action mailed Dec. 21, 2012, 23 pages.
U.S. Appl. No. 12/984,244, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/965,645, filed Dec. 10, 2010, Non-Final Office Action, mailed Jul. 19, 2013, 20 pages.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
Liu, Yue et al., "Recognition of QR code with mobile phones," Control and Decision Conference, 2008. CCDC 2008. Jul. 2-4, 2008, pp. 203, 206.
U.S. Appl. No. 12/961,369, filed Dec. 6, 2010, Non-Final Office Action mailed Mar. 25, 2013, 17 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/973,431, filed Dec. 20, 2010, Final Office Action mailed Jun. 27, 2013, 11 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.
U.S. Appl. No. 12/964,478, filed Dec. 9, 2010, Non-Final Office Action mailed Mar. 26, 2013, 19 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
First Examination Report from European Patent Office dated Feb. 4, 2015 for EP 12716751.8, 4 pages.
Office Action dated Nov. 12, 2014 for Mexican Patent Application No. MX/a/2013/009794 is not translated into English, 2 pages.
Office Action dated Jan. 28, 2015 for Mexican Patent Application No. MX/a/2013/006973 is not translated into English, 3 pages.
Office Action from European Patent Office for Application No. 12716728.6 dated Feb. 26, 2015, 4 pages.
European Search Report for EP 11844504 dated Feb. 24, 2015, 10 pages.
U.S. Appl. No. 14/179,336, filed Feb. 12, 2014 Notice of Allowance mailed Feb. 18, 2015, 15 pages.
U.S. Appl. No. 13/035,474, filed Feb. 25, 2011 Non Final Rejection mailed Feb. 17, 2015, 57 pages.
Office Action dated Feb. 18, 2015 for Mexican Patent Application No. MX/a/2013/009794, 1 page.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.

(56) References Cited

OTHER PUBLICATIONS

U.S. Appl. No. 12/953,227, filed Nov. 23, 2010, Non Final Office action mailed Mar. 24, 2015, 39 pages.
U.S. Appl. No. 13/006,270, filed Jan. 13, 2011, Final Office Action mailed Mar. 23, 2014, 51 pages.
Extended European Search Report for EP 11850819 dated Mar. 17, 2014, 2 pages.
International Preliminary Report on Patentability of PCT/US2012/048032 mailed on Apr. 3, 2014, 6 pages.
U.S. Appl. No. 12/961,369, filed Dec. 6, 2010, Non-Final Office Action mailed Feb. 13, 2014, 21 pages.
U.S. Appl. No. 12/971,349, filed Dec. 7, 2010, Notice of Allowance mailed Oct. 02, 2013, 24 pages.
U.S. Appl. No. 12/965,645, filed Dec. 10, 2010, Final Office Action, mailed Mar. 18, 2014, 24 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.
U.S. Appl. No. 13/035,474, filed Feb. 25, 2011, Non Final Rejection mailed Mar. 6, 2014, 20 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Non-Final Office Action mailed Jan. 17, 2014, 21 pages.
Extended European Search Report for EP 11842890.3 dated Mar. 26, 2014, 8 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2011/063111 mailed Jun. 13, 2013, 8 pages.
International Preliminary Report on Patentability of PCT/US2012/048032 mailed Apr. 3, 2014, 6 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp. 8, XP031887368, DOI: 10.1109/MTAS.2005.207166; ISBN: 978-981-05-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014, Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Notice of Allowance, mailed Jun. 20, 2014, 35 pages.
U.S. Appl. No. 13/028,030, filed Feb. 15, 2011, Final Office Action mailed Jul. 11, 2014, 43 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/968,611, filed Aug. 16, 2013, Notice of Allowance mailed May 2, 2014, 40 pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
First Office Action by the Mexican Institute of Industrial Property for Mexican Patent Application No. MX/a/2013/00988 dated Aug. 14, 2014, 3 pages.
International Preliminary Report on Patentability for PCT/US2011/060002 mailed Jun. 6, 2013, 6 pages.
International Preliminary Report on Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/US2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486 dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
U.S. Appl. No. 13/034,482, filed Feb. 24, 2011 Notice of Allowance mailed Aug. 29, 2014, 45 pages.
U.S. Appl. No. 13/035,474, filed Feb. 25, 2011 Final Rejection mailed Aug. 27, 2014, 38 pages.
U.S. Appl. No. 13/006,270, filed Jan. 13, 2011 Non-Final Office Action mailed Sep. 12, 2014, 41 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
The First Office Action dated Sep. 11, 2014 for Mexican Patent Application No. MX/a/2013/007672 is not translated into English, 2 pages.
The Notice of Allowance for Mexican Patent Application No. MX/a/2013/009882 is not translated into English, 1 page.
U.S. Appl. No. 14/179,336, filed Feb. 12, 2014 Final Office Action mailed Dec. 1, 2014, 30 pages.
U.S. Appl. No. 13/475,794, filed May 18, 2012 Non-Final Office Action mailed Nov. 21, 2014, 33 pages.
U.S. Appl. No. 13/302,717, filed Nov. 22, 2011 Non-Final Rejection mailed Dec. 18, 2014, 71 pages.
U.S. Appl. No. 13/028,030, filed Feb. 15, 2011, Non-Final Office Action mailed Feb. 6, 2015, 56 pages.

(56) References Cited

OTHER PUBLICATIONS

U.S. Appl. No. 13/016,483, filed Jan. 28, 2011 Non-Final Office Action mailed Nov. 3, 2014, 33 pages.
U.S. Appl. No. 12/973,431, filed Dec. 20, 2010 Non-Final Rejection mailed Dec. 19, 2014, 30 pages.
U.S. Appl. No. 12/960,285, filed Dec. 3, 2010 Final Office Action mailed Dec. 3, 2014, 19 pages.
First Examination Report from European Patent Office dated May 18, 2015 for EP 11849496.2, 7 pages.
European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
Notice of Allowance by the Mexican Institute of Industrial Property for Mexican Patent Application No. MX/a/2013/009881 dated Jan. 12, 2015, 1 page.
First Office Action for CN 201180065044.7 issued Feb. 13, 2015 by the State Intellectual Property Office, 4 pages.
U.S. Appl. No. 13/475,794, filed May 18, 2012 Final Office Action mailed Jun. 1, 2015, 45 pages.
U.S. Appl. No. 13/302,717, filed Nov. 22, 2011 Final Rejection mailed May 8, 2015, 44 pages.
U.S. Appl. No. 13/037,302, filed Feb. 28, 2011 Final Office Action mailed May 4, 2015, 54 pages.
U.S. Appl. No. 13/016,483, filed Jan. 28, 2011 Final Office Action mailed May 13, 2015, 34 pages.
U.S. Appl. No. 12/973,431, filed Dec. 20, 2010 Notice of Allowance mailed May 28, 2015, 20 pages.
U.S. Appl. No. 12/960,285, filed Dec. 3, 2010 Non-Final Office Action mailed May 14, 2015, 21 pages.
Office Action from European Patent Office for Application No. 11852630.0 dated May 12, 2015, 7 pages.
Office Action from State Intellectual Property Office for CN Appln. No. 201180056242.7 received Jun. 17, 2015, 10 pages.
Office Action dated Apr. 22, 2015 for Mexican Patent Application No. MX/a/2013/009883, 2 pages.
U.S. Appl. No. 13/028,030, filed Feb. 15, 2011, Final Office Action mailed Jul. 17, 2015, 63 pages.
Notice of Allowance and search report for ROC (Taiwan) Patent Application No. 101106288 received May 29, 2015, 9 pages.
The Second Office Action dated Jun. 1, 2015 for Mexican Patent Application No. MX/a/2013/007672 is not translated into English, 2 pages.
The First Office Action dated Jul. 13, 2015 for Mexican Patent Application No. MX/a/2013/009791 is not translated into English, 2 pages.
Office Action and Search Report from the State Intellectual Property Office for CN Pat. Appln. No. 201180066584.7 issued on Jul. 10, 2015, 12 pages.
U.S. Appl. No. 13/035,474, filed Feb. 25, 2011 Non Final Rejection mailed Sep. 11, 2015, 65 pages.
U.S. Appl. No. 13/864,474, filed Apr. 17, 2013 Non Final Office Action mailed Aug. 11, 2015, 59 pages.

* cited by examiner

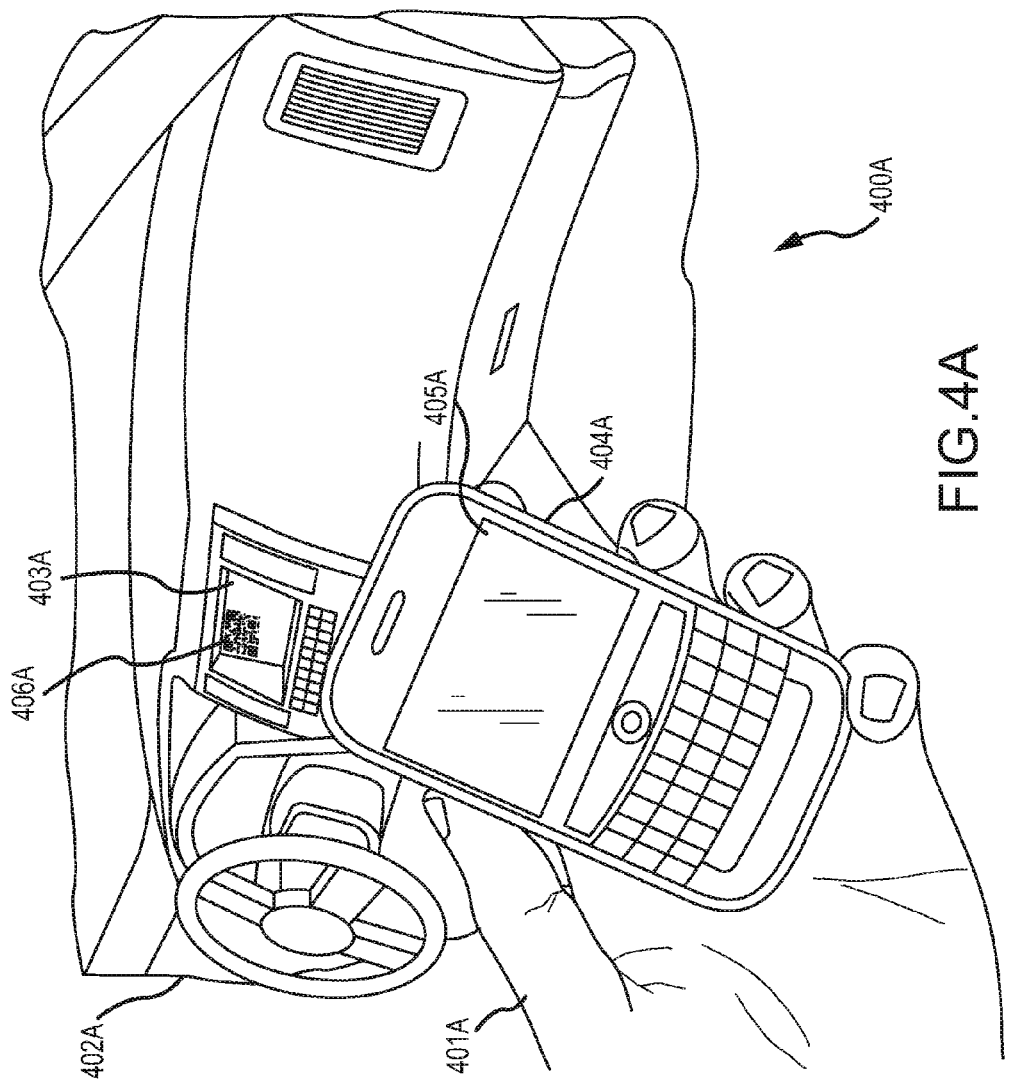

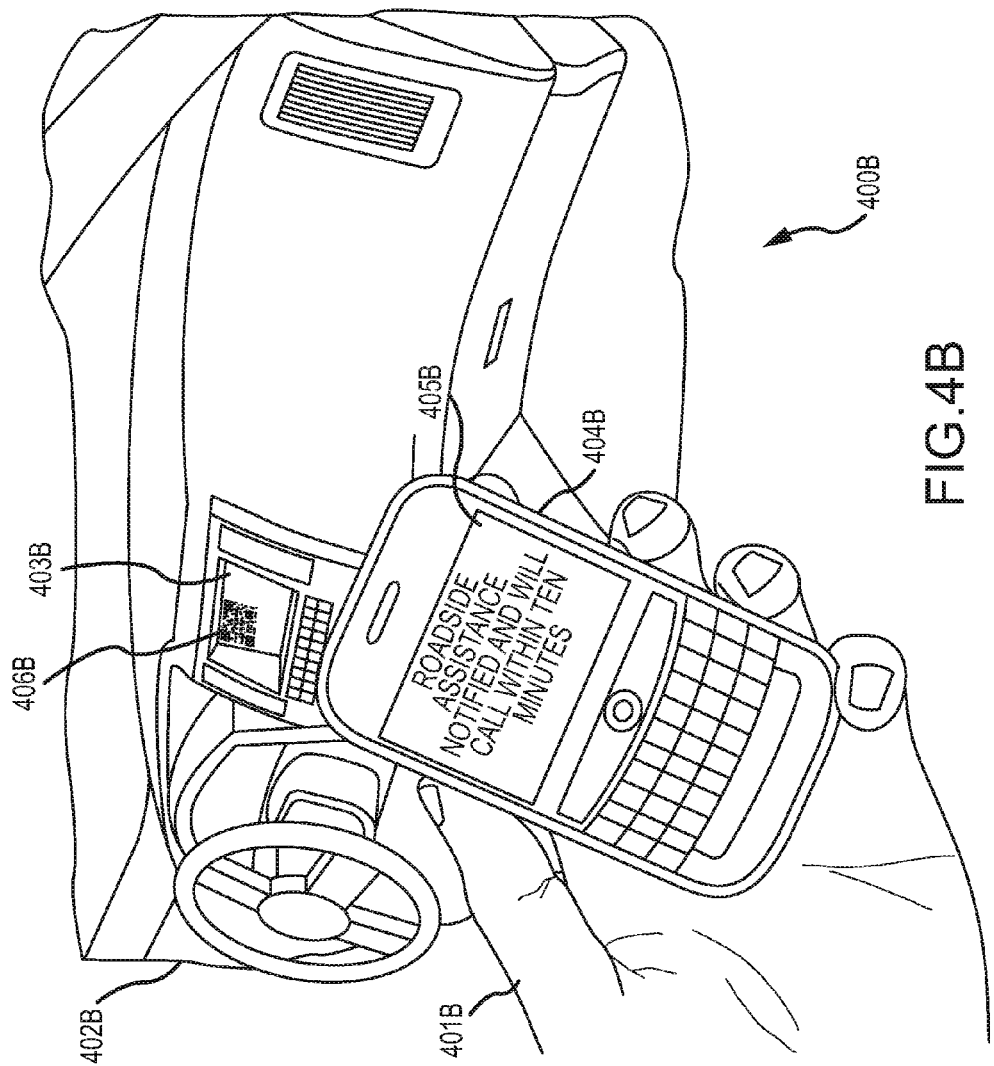

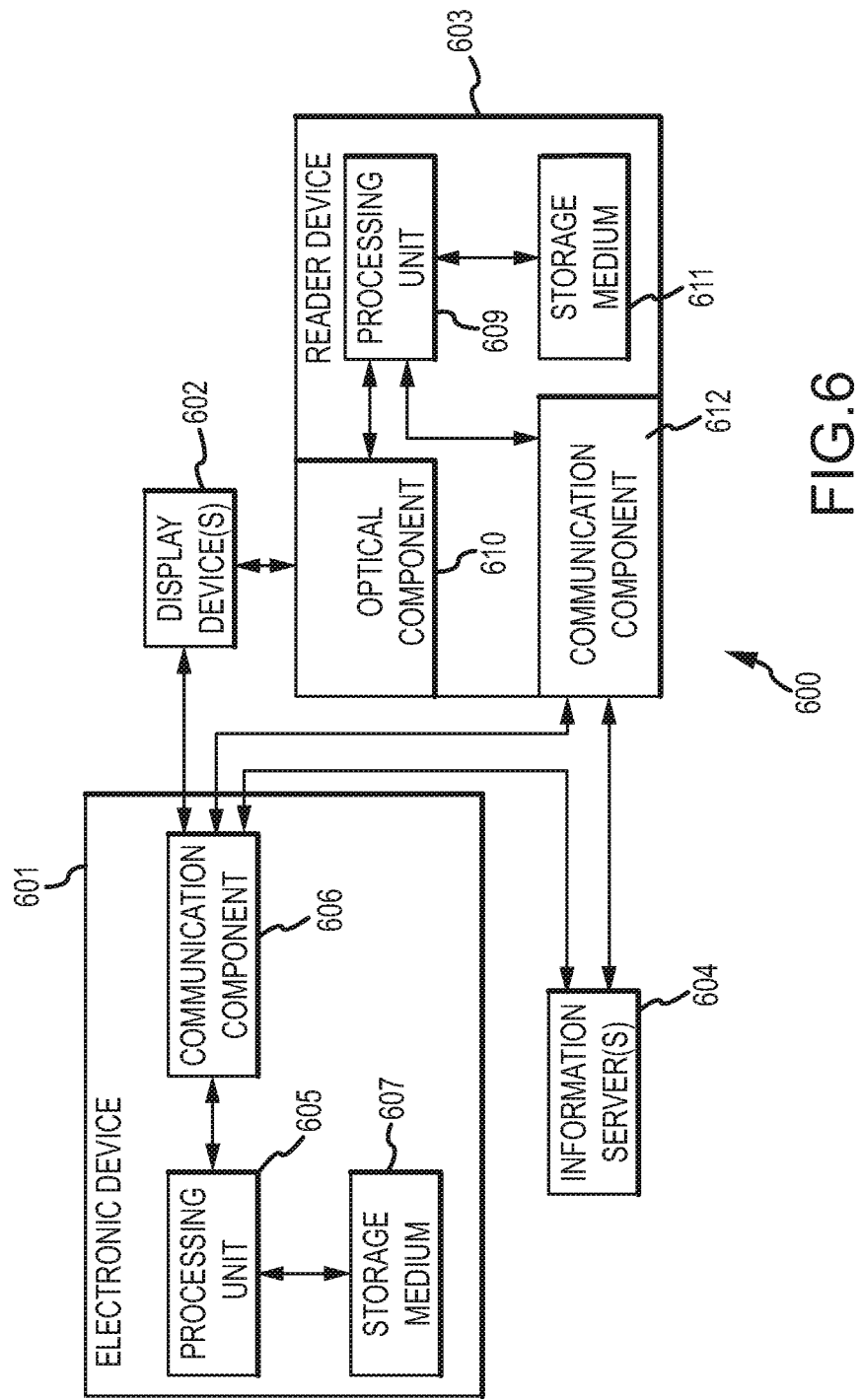

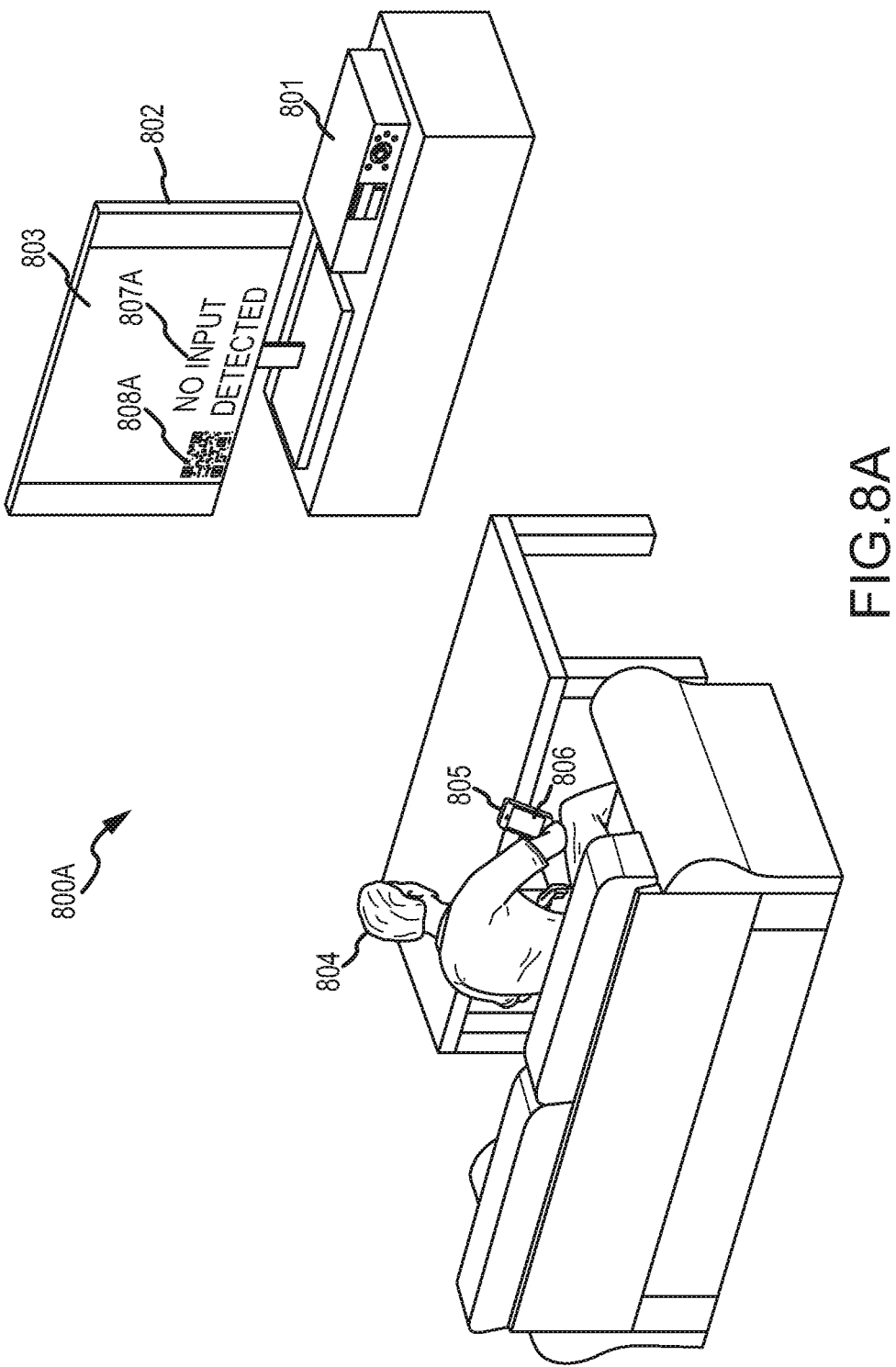

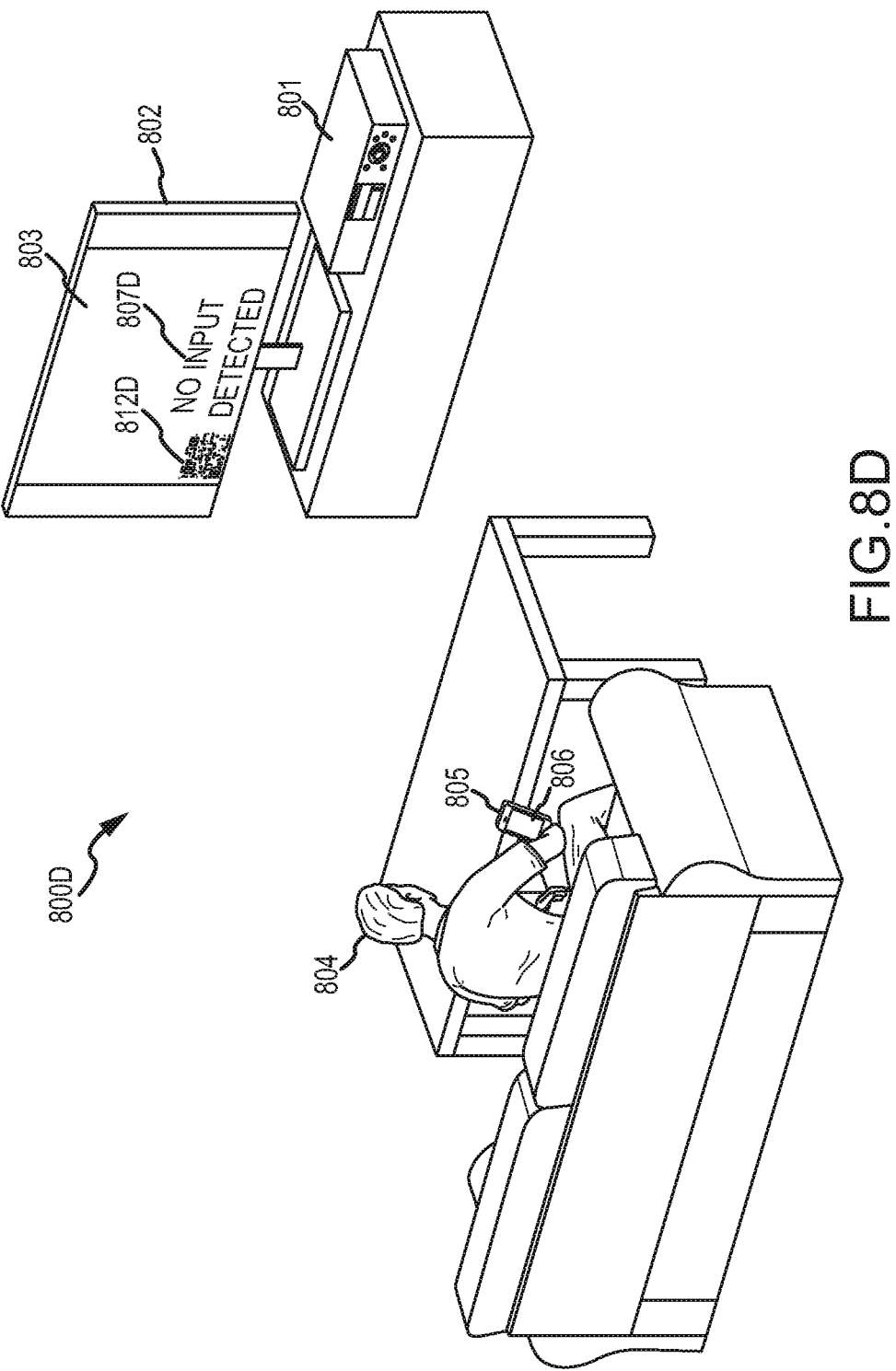

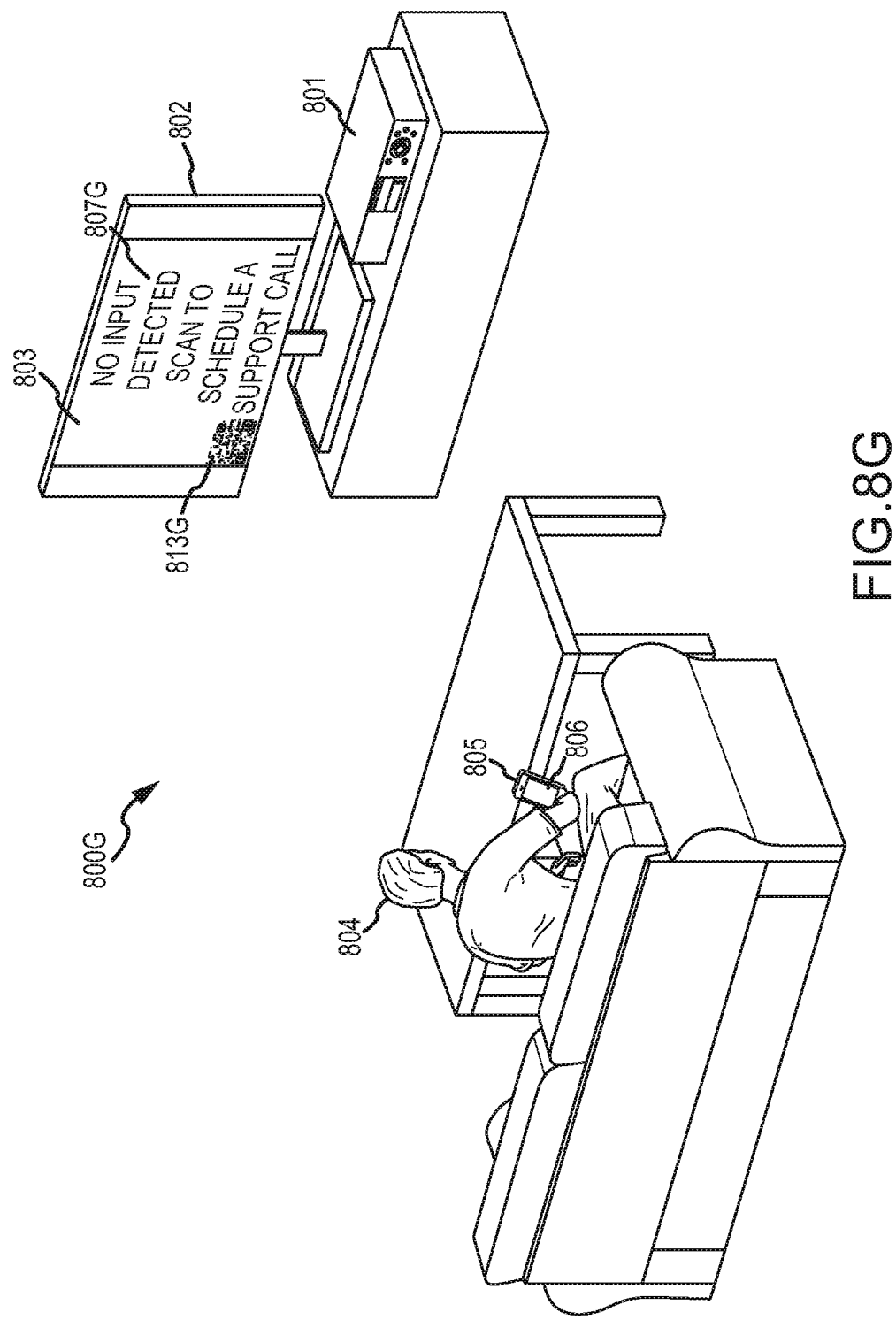

FACILITATING USER SUPPORT OF ELECTRONIC DEVICES USING MATRIX CODES

RELATED APPLICATIONS

This application is a continuation-in-part application of U.S. patent application Ser. No. 12/953,227, entitled "Facilitating User Support of Electronic Devices Utilizing Dynamic Matrix Code Generation," filed on Nov. 23, 2010, which is hereby incorporated by reference in its entirety.

FIELD OF THE INVENTION

This disclosure relates generally to user support of electronic devices, and more specifically to electronic devices providing error messages that include matrix codes which can then be displayed and scanned to access information regarding resolution of error conditions related to the error messages.

SUMMARY

The present disclosure discloses systems, apparatuses, and methods for facilitating user support of an electronic device using matrix codes. An electronic device may detect that an error condition has occurred and may select a matrix code based on the error condition. The electronic device may include the selected matrix code in an error message. After the electronic device transmits the error message to a display device, a reader device may detect the displayed matrix code. The reader device may decode the matrix code to access and present information regarding resolution of the error condition.

In one or more implementations, the electronic device may select the matrix code by looking up the error condition in a table that lists correspondences between error conditions and matrix codes. In one or more other implementations, the electronic device may dynamically generate the matrix code and may include information specific to the electronic device in the generated matrix code.

In various implementations, the electronic device may determine that the information regarding resolution of the error condition has been utilized to unsuccessfully resolve the error condition. The electronic device may determine such by monitoring operations performed by the electronic device, by receiving indications of such from the reader device and/or one or more user interfaces of the electronic devices, and so on. In some cases, if the electronic device determines that the information regarding resolution of the error condition has been utilized to unsuccessfully resolve the error condition, the electronic device may select and transmit and additional matrix code that may be decoded by the reader device to access and present an additional set of information regarding resolution of the error condition. In other cases, if the electronic device determines that the information regarding resolution of the error condition has been utilized to unsuccessfully resolve the error condition, the electronic device may select and transmit and additional matrix code that may be decoded by the reader device to initiate an electronic device support request. Whether the additional matrix code selected by the electronic device can be decoded to access and present an additional set of information regarding resolution of the error condition or to initiate an electronic device support request may be dependent on received user input, the fact that a threshold number of sets of information regarding resolution of the error condition have been unsuccessfully utilized, the fact that additional sets of information regarding resolution of the error condition do not exist or are not available, and so on.

In some implementations, the reader device may prompt for login information before presenting the information regarding resolution of the error condition. The reader device may require login information prior to presenting the information related to resolution of the error condition in order to restrict access to technical support personnel, users who have subscribed to a support service, registered users, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4A-4C are diagrams illustrating a second example system that facilitates user support for an automobile. The system may be the system of FIG. 1.

FIG. 6 is a block diagram illustrating a system for facilitating user support of an electronic device using matrix codes.

FIGS. 8A-8I are diagrams illustrating an example system that facilitates user support for a set top box utilizing matrix codes. The system may be the system of FIG. 6.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Electronic devices (such as televisions, television receivers, digital video recorders, digital video disc players, automobiles, computing devices, telephones, kitchen appliances, video game systems, security systems, and so on) are often complex to operate. When an electronic device encounters an error condition during operation, the electronic device may present an error message (such as a pop-up error message) indicating that the error condition has been encountered. However, error messages may be cryptic or difficult for users to understand. Even when users are able to understand from error messages exactly what error condition has occurred, they may be uncertain or unaware exactly what they should do in order to resolve the error condition.

The present disclosure discloses systems, apparatuses, and methods for facilitating user support of an electronic device using matrix codes. An electronic device may detect that an error condition has occurred. In response to detecting that the error condition has occurred, the electronic device may select a matrix code. The electronic device may include the selected matrix code in an error message and transmit the error message to a display device. A reader device may detect the matrix code displayed on the display device, decode the matrix code, and utilize information decoded from the detected matrix code to access and present information regarding resolution of the error condition.

Figure 1:
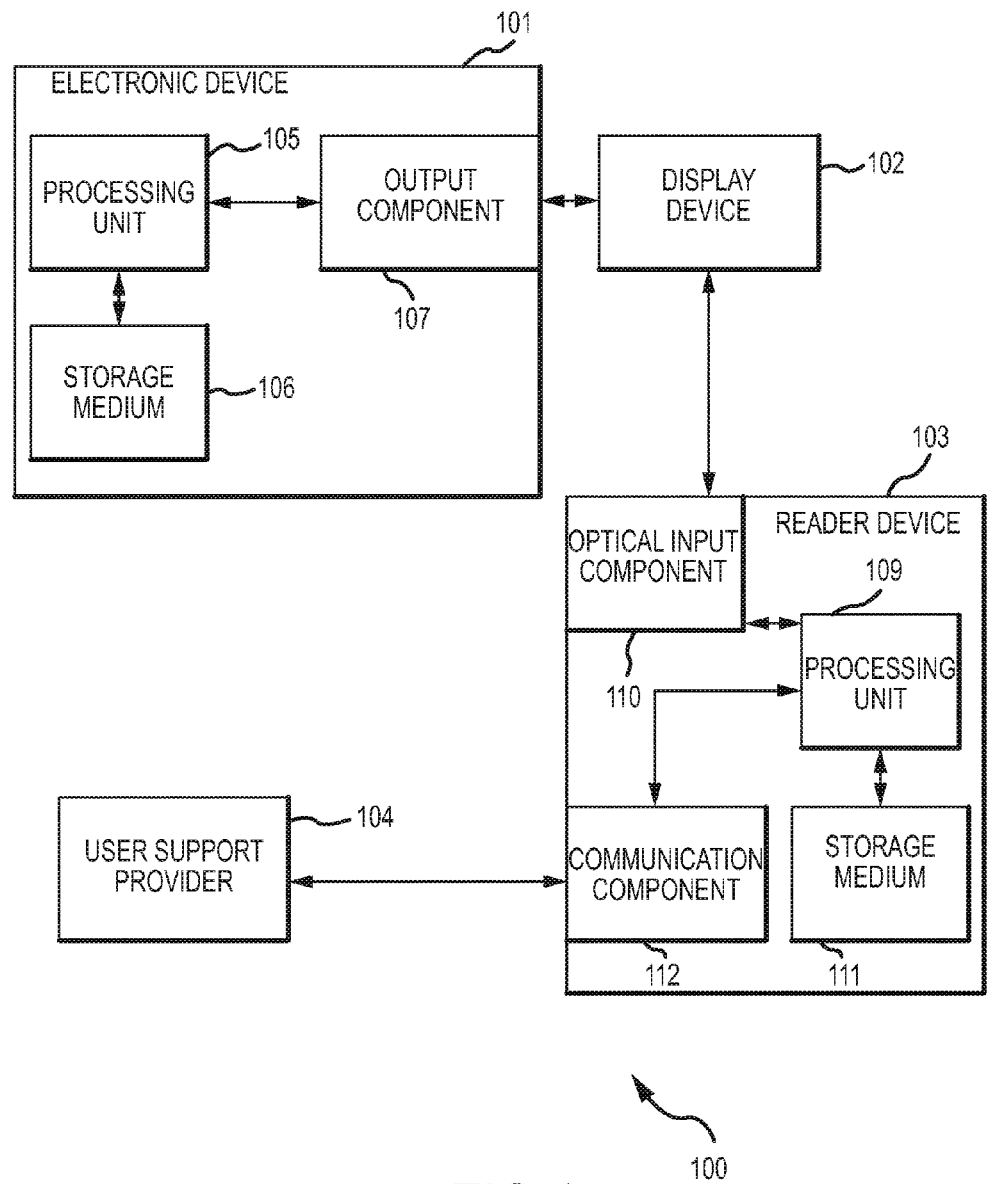
FIG. 1 is a block diagram illustrating a system for facilitating user support of an electronic device using dynamic matrix code generation.

FIG. 1 is a block diagram illustrating a system 100 for facilitating user support of an electronic device using dynamic matrix code generation. The system 100 may include a electronic device 101 (which may be any kind of electronic device such as a television, a television receiver, a digital video recorder, a digital video disc player, an automobile, a computing device, a telephone, a kitchen appliance, a video game system, a security system, and so on), at least one display device 102 (which may be any kind of display device such as a cathode ray tube display, a liquid crystal display, a television, a computer monitor, and so on), and a reader device 103 (which may be any kind of device capable of detecting and decoding a matrix code such as a telephone equipped with a camera, a mobile computing device that includes a camera, and so on). The system may also include a user support provider 104.

The electronic device 101 may include one or more processing units 105, one or more one or more non-transitory storage media 106 (which may take the form of, but is not limited to, a magnetic storage medium; optical storage medium; magneto-optical storage medium; read only memory; random access memory; erasable programmable memory; flash memory; and so on), and one or more output components 107. Additionally, although the display device 102 is illustrated as separate from the electronic device, it is understood that in various implementations the display device may be incorporated into the electronic device. The processing unit of the electronic device may execute instructions stored in the non-transitory storage medium to derive information specific to the electronic device that relates to operation of the electronic device, dynamically generate one or more matrix codes (such as one or more QR codes) that include the information specific to the electronic device as well as user support information for the electronic device, and transmit the dynamically generated matrix code to the display device utilizing the output component.

Subsequently, the reader device 103 may detect the matrix code displayed by the display device 102, decode the information specific to the electronic device 101 and the user support information, and initiate one or more user support requests based on the decoded information. As part of initiating the user support request, the reader device may transmit the information specific to the electronic device to the user support provider 104. The user support information may include information regarding how the reader device will transmit the information specific to the electronic device to the user support provider (such as including a web address whether the user support provider may be contacted, an email address for a user support representative of the user support provider, a telephone number for the user support provider and so on. The reader device may include one or more processing units 109 which execute instructions stored in one or more non-transitory storage media 111 in order to perform the above described functions. The reader device may also include an optical input device 110 (such as a camera, a barcode scanner, and so on) for detecting the matrix code displayed by the display device as well as a communication component 112 for communicating with the user support provider.

The information specific to the electronic device 101 may include a variety of different information that is specific to the operation of the electronic device. For example, the information may include electronic device identifiers (such as network addresses, serial numbers, media access control numbers, and so on), electronic device configuration information (such as the individual hardware components included in the electronic device and/or identifiers for such components, drivers utilized on the electronic device, options set for the electronic device, a current status of the electronic device, and so on), error codes for errors that have occurred during electronic device operation (such as an error number associated with an error that has occurred, debug information, a core dump, and so on), account information for one or more customer accounts (such as subscription service accounts, warrantee accounts, support agreement accounts, and so on) associated with the electronic device, a location of the electronic device (such as a global positioning system location, a mailing address, and so on), and so on. For instance, in implementations where the electronic device includes a television receiver, the information specific to the television receiver may include a serial number for the receiver, a media access control number for the receiver, current settings for the receiver, current channel information for the receiver, account information for a programming subscription related to the television receiver, information on hardware included in the television receiver, a mailing address associated with the television receiver, and so on.

The user support information for the electronic device 101 may include a variety of information that may be utilized to initiate user support requests based on the information specific to the electronic device. For example, the user support information may include a web site address to which to transmit error codes and the web site may provide a user tutorials regarding operation of the electronic device related to the error code. By way of another example, the user support information may include a network address for a user support provider 104 response system to which user contact information, electronic device identifiers, error codes, and so on may be transmitted such that the response system may automatically correct a problem with the electronic device, schedule a service call (which may be performed via telephone, email, an onsite visit, and so on) and inform the user of the scheduled service call, and so on. By way of still another example, user support information may include an identifier for an application resident on the reader device 103 such as an electronic device password recovery application which may be passed an encrypted version of the password, one or more password recovery verification questions, and one or more encrypted password recovery verification answers. As such, the electronic device password recovery application may prompt a user with the one or more password recovery verification questions, compare the user's answers with the encrypted answers, and present the user with a decrypted version of the password if the answers are correct.

In some implementations, the electronic device 101 may dynamically generate the matrix codes upon the occurrence of an error during operation of the electronic device. For example, a refrigerator may dynamically generate a matrix code that includes an error code and transmit the matrix code to an associated display device when a cooling component ceases cooling. In other implementations, the electronic device 101 may dynamically generate the matrix codes in response to receiving a user input. For example, a user may call a user support line to obtain user support for a software product on a computer. A user support representative assisting the user may need to know configuration information about the computer in order to provide user support. The user support representative may include the user to launch a program on the computer for dynamically generating and displaying a matrix code that, when the user scans it with their smart phone, decodes the configuration information and transmits it to the user support representative.

In various implementations, the electronic device 101 may transmit the one or more matrix codes by themselves to the display device 102 via the output component 107 for the display device to display only the one or more matrix codes at a particular time. However, in various other implementations (such as implementations where the electronic device is a television receiver, digital video recorder, or other such device that provides images to a display), the electronic device may transmit one or more images (such as a video stream) to the display device via the output component. In such implementations, the electronic device may combine the one or more matrix codes with the one or more images and transmit the combination to the display device via the output component.

Figure 2:
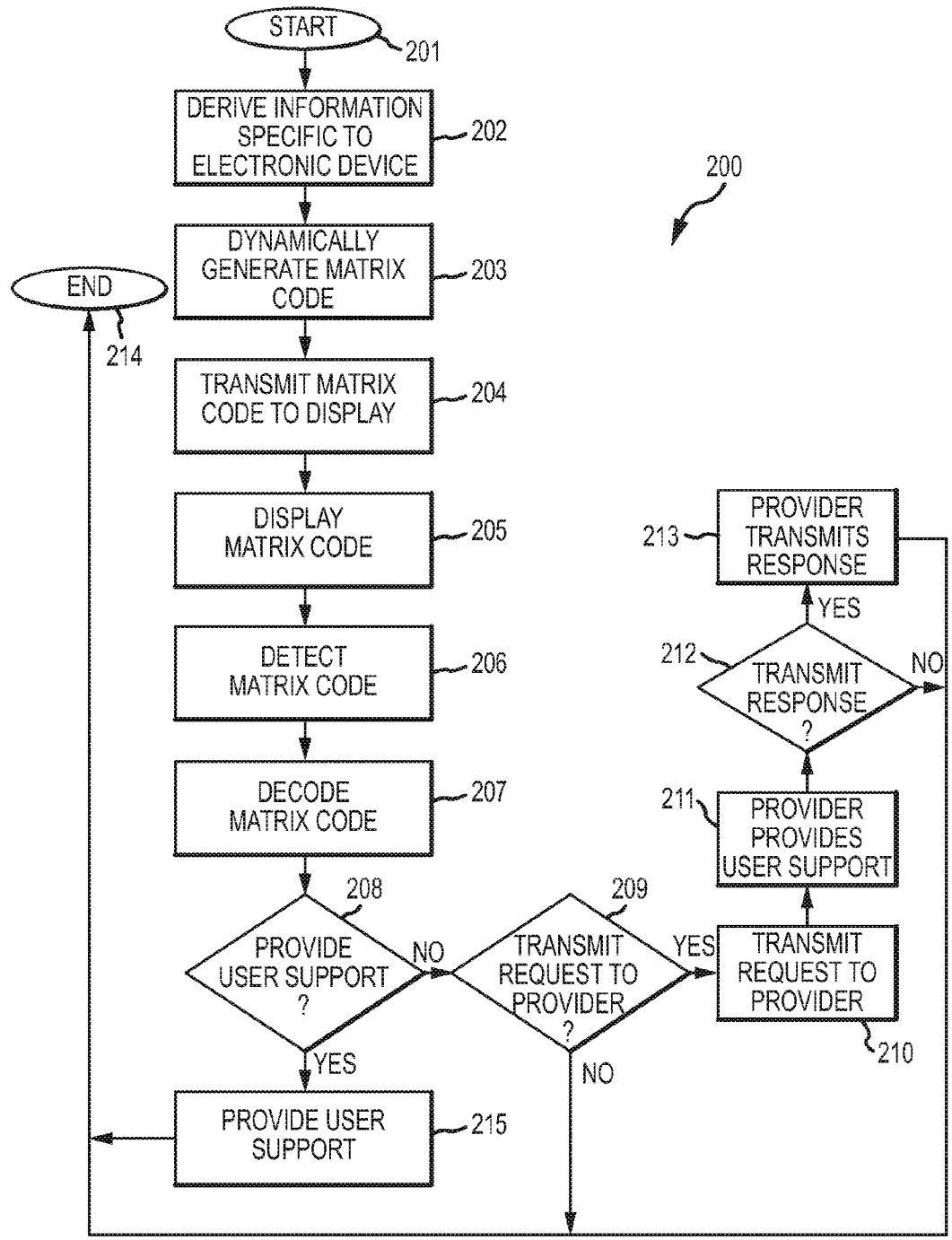
FIG. 2 is a flow chart illustrating a method for facilitating user support of an electronic device using dynamic matrix code generation. This method may be performed by the system of FIG. 1.

FIG. 2 illustrates a method 200 for facilitating user support of an electronic device using dynamic matrix code generation. The method 200 may be performed by the system 100 of FIG. 1. The flow begins at block 201 and proceeds to block 202 where the processing unit 105 of the electronic device 101 derives the information specific to the electronic device. The flow then proceeds to block 203 where the processing unit dynamically generates a matrix code (such as a QR code) that includes the information specific to the electronic device and the user support information. Then, the flow proceeds to block 204 where the processing unit transmits the dynamically generated matrix code to the display device 102 via the output component 107 before the flow proceeds to block 205.

At block 205, the display device 102 displays the matrix code that was transmitted by the processing unit 105 of the electronic device 101 via the output component 107. The flow then proceeds to block 206.

At block 206, the reader device 103 detects the matrix code displayed on the display device 102. The flow then proceeds to block 207 where the reader device decodes the detected matrix code. Decoding the detected matrix code may include decoding the information specific to the electronic device and the user support information that is included in the matrix code. The flow then proceeds to block 208 where the reader device determines from the decoded user support information whether or not the reader device will provide user support. If so, the flow proceeds to block 215 where the reader device provides the user support before the flow proceeds to block 214 and ends. Otherwise, the flow proceeds to block 209.

At block 209, after the reader device 103 determines that the reader device will not provide user support, the reader device 103 determines from the decoded user support information whether or not to transmit a user support request to the user support provider 104. If not, the flow proceeds to block 214 and ends. Otherwise, the flow proceeds to block 210 where the reader device transmits a user support request including the decoded information specific including the electronic device to the user support provider 104 as specified by the decoded user support information.

The flow then proceeds to block 211 where the user support provider 104 provides the requested user support and the flow proceeds to block 212. At block 212, the user support provider determines whether or not to transmit a response to the user support request. The user support provider may not submit a response to the user support request if the user support request can be fulfilled without additional user involvement. However, the user support provider may submit a response for a variety of reasons such as if the user support request cannot be fulfilled without additional involvement (i.e., if the user support provider needs to schedule a telephone call with the user to provider the requested user support), if the user support provider provides a confirmation (i.e., an acknowledgement that the user support request was received, a notification as to the contents of the user support request that was received, and so on), if the user support provider will provide tutorials concerning the user support request, and so on.

If the user support provider 104 determines not to transmit a response to the user support request, the flow proceeds to block 214 and ends. Otherwise, the flow proceeds from block 212 to block 213 where the user support provider transmits the response. The user support provider may transmit the response to the reader device 103, the electronic device 101, another communication device utilized by the user (such as a telephone, an in person visit, an email address, and so on), and so on. The flow then proceeds to block 214 and ends.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3A:
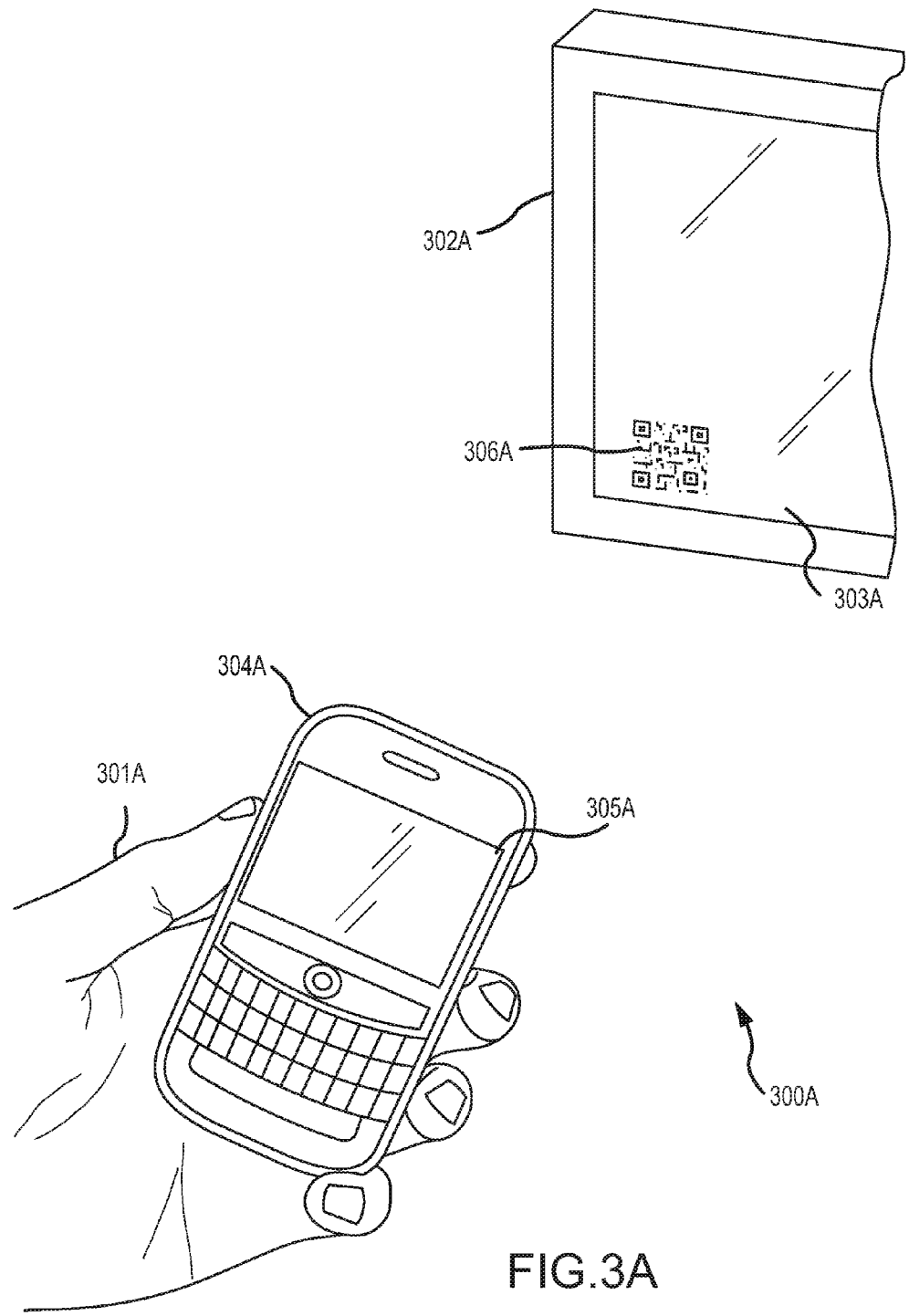
FIGS. 3A-3B are diagrams illustrating a first example system that facilitates user support for a television receiver. The system may be the system of FIG. 1.
Figure 3B:
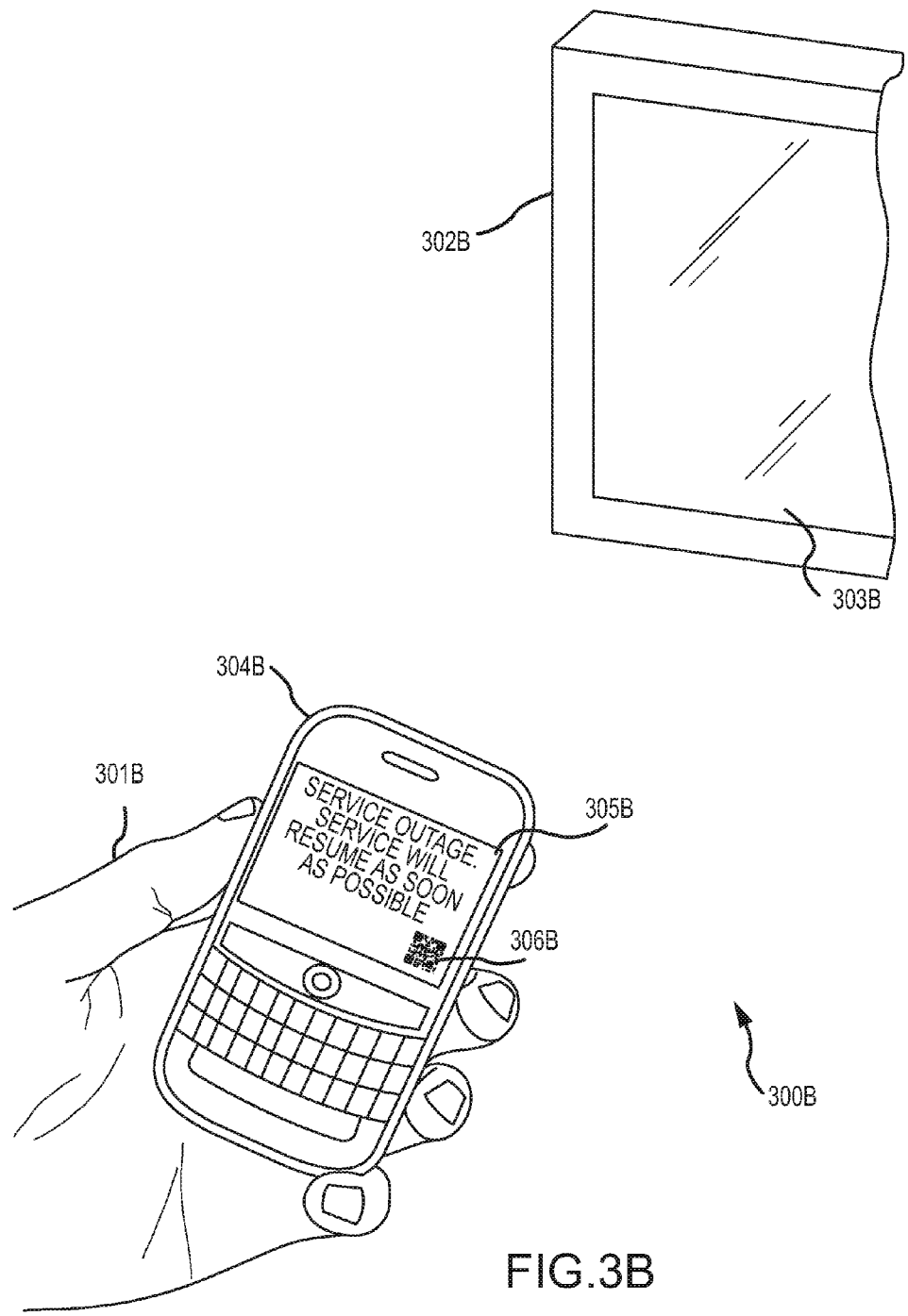

FIGS. 3A-3B illustrate a first example system 300A-300B that facilitates user 301A-301B support for a television receiver. As illustrated in FIG. 3A, the system 300A includes a television 302A (which incorporates a television receiver for receiving television programming from a programming provider for the television 302A) and a user 301A. In this example, the television detects an error condition because the television receiver is not receiving a signal from the programming provider. As such, the television dynamically determines information specific to the television which includes a physical address associated with the television receiver, a network address for the television receiver, an identifier for the television receiver, an account number for the programming provider account associated with the television receiver, and an error code corresponding to the error condition of no signal. The television dynamically generates a QR code 306A that includes the dynamically determined information specific to the television. Further, the television includes user support information in the QR code specifying to transmit the information specific to the television to a customer support system of the programming provider (such as via a web interface). The television then displays the QR code on the screen 303A of the television. In order to request user support, the user takes a picture of the QR code on the screen of the television with a cellular phone 304A that is executing a QR code reader program. The QR code reader program detects and decodes the QR code. Based on the decoded user support information, the cellular phone then transmits the decoded information specific to the television to the customer support system of the programming provider.

In this example, the television receiver is not receiving a signal from the programming provider because of a network outage that the programming provider is already aware of and is already attempting to fix. As such, the programming provider may transmit a response to the user indicating that the problem is related to a service outage that the programming provider is working to correct. FIG. 3B depicts a response from the programming provider received by the cellular phone 304B and displayed on a display screen 305B of the cellular phone.

Figure 4C:
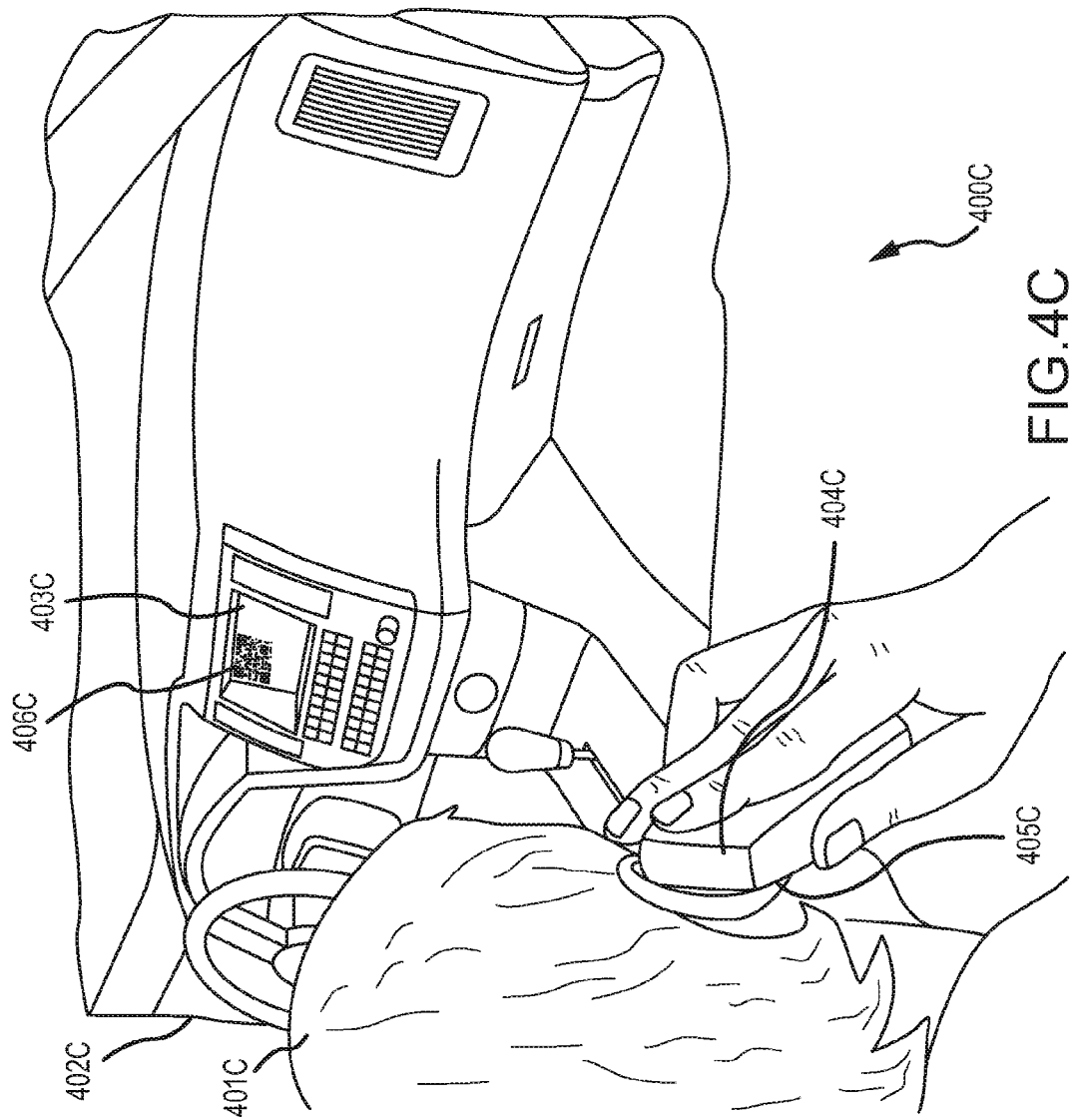

FIGS. 4A-4C illustrate a second example system 400A-400C that facilitates user 401A-401C support for an automobile 402A-402C. As illustrated in FIG. 4A, the system 400A includes an automobile 402A and a user 401A. In this example, the automobile detects an error condition because the engine of the automobile has locked up. As such, the automobile dynamically determines information specific to the automobile which includes a global position system location for the automobile, name information for the owner of the automobile, account information for a roadside assistance account associated with the automobile, and an error code corresponding to the error condition of locked engine. The automobile dynamically generates a QR code 406A that includes the dynamically determined information specific to the automobile. Further, the automobile includes user support information in the QR code specifying to transmit the information specific to the automobile to a roadside assistance system (such as via a web interface). The automobile then displays the QR code on a dashboard display screen 503A of the automobile. In order to request user support, the user takes a picture of the QR code on the dashboard display screen with a personal digital assistant 404A that is executing a QR code reader program. The QR code reader program detects and decodes the QR code. Based on the decoded user support information, the personal digital assistant then transmits the decoded information specific to the automobile to the roadside assistance system.

In this example, the automobile 402A may require an on site mechanic visit in order to repair the locked engine. As such, the roadside assistance system may determine when a telephone support representative will be able to call the user 401A and transmit a notification regarding when the telephone support representative will call the user. FIG. 4B depicts a response from the roadside assistance system received by the personal digital assistant 404B and displayed on a display screen 405B of the personal digital assistant. As the response indicates, a telephone service representative from roadside assistance will call the user 401B within ten minutes to either help the user troubleshoot the problem, send out a mechanic, call a tow truck, and so on. FIG. 4C depicts the user 401C speaking to the telephone service representative when the telephone service representative makes the scheduled telephone service call to the personal digital assistant 404C.

Figure 5A:
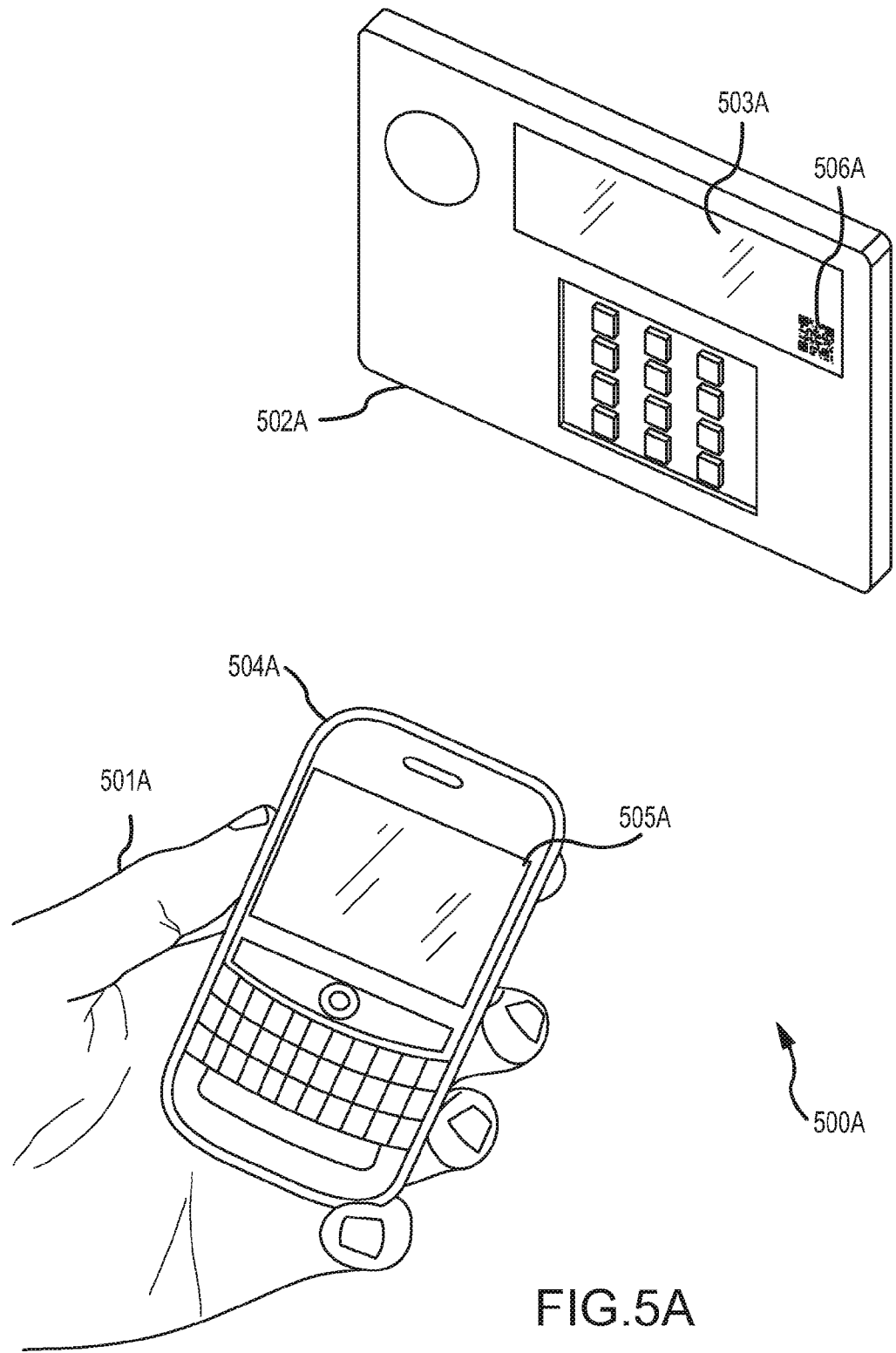
FIGS. 5A-5C are diagrams illustrating a third example system that facilitates user support for a security system. The system may be the system of FIG. 1.
Figure 5B:
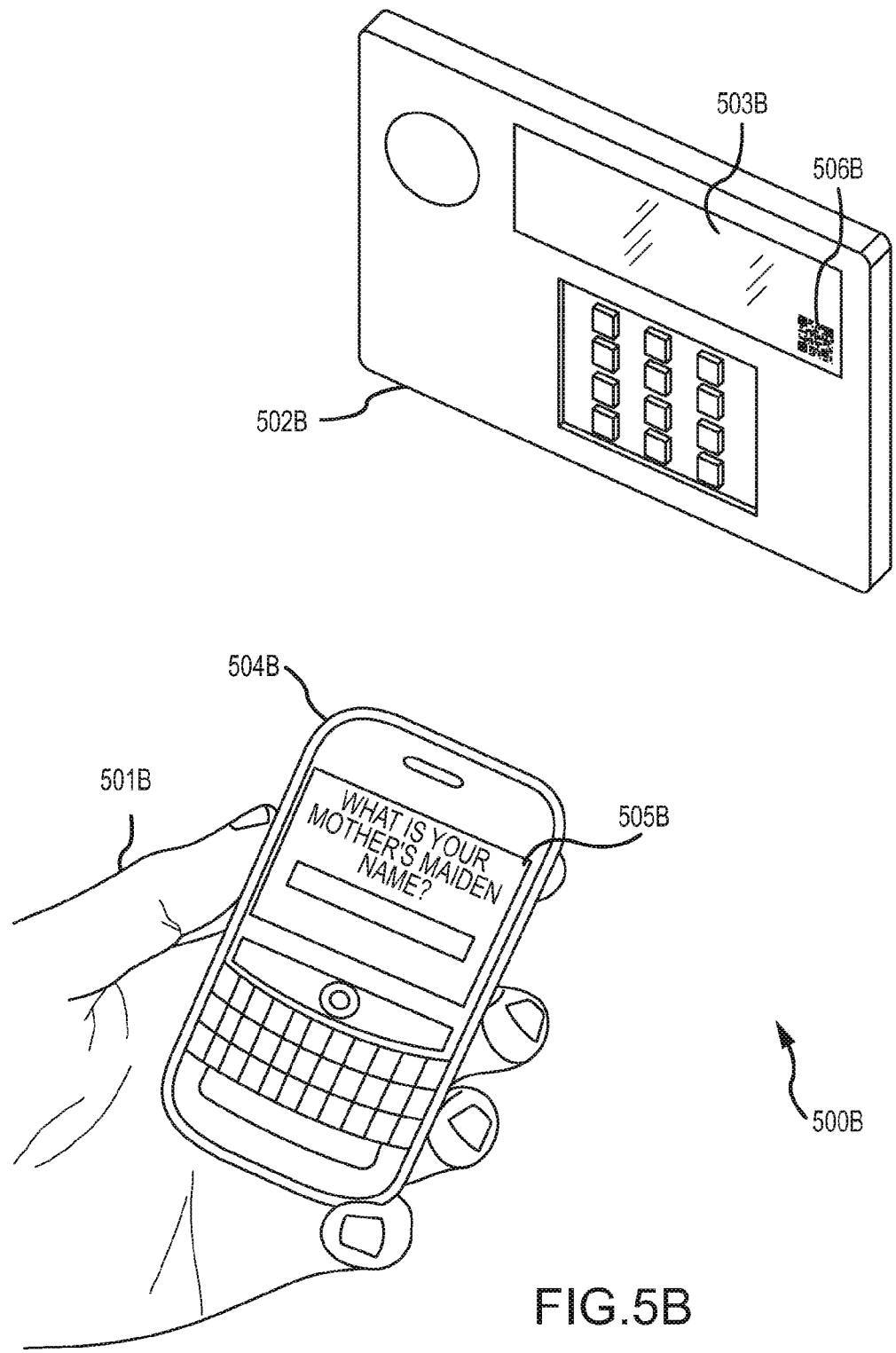
Figure 5C:
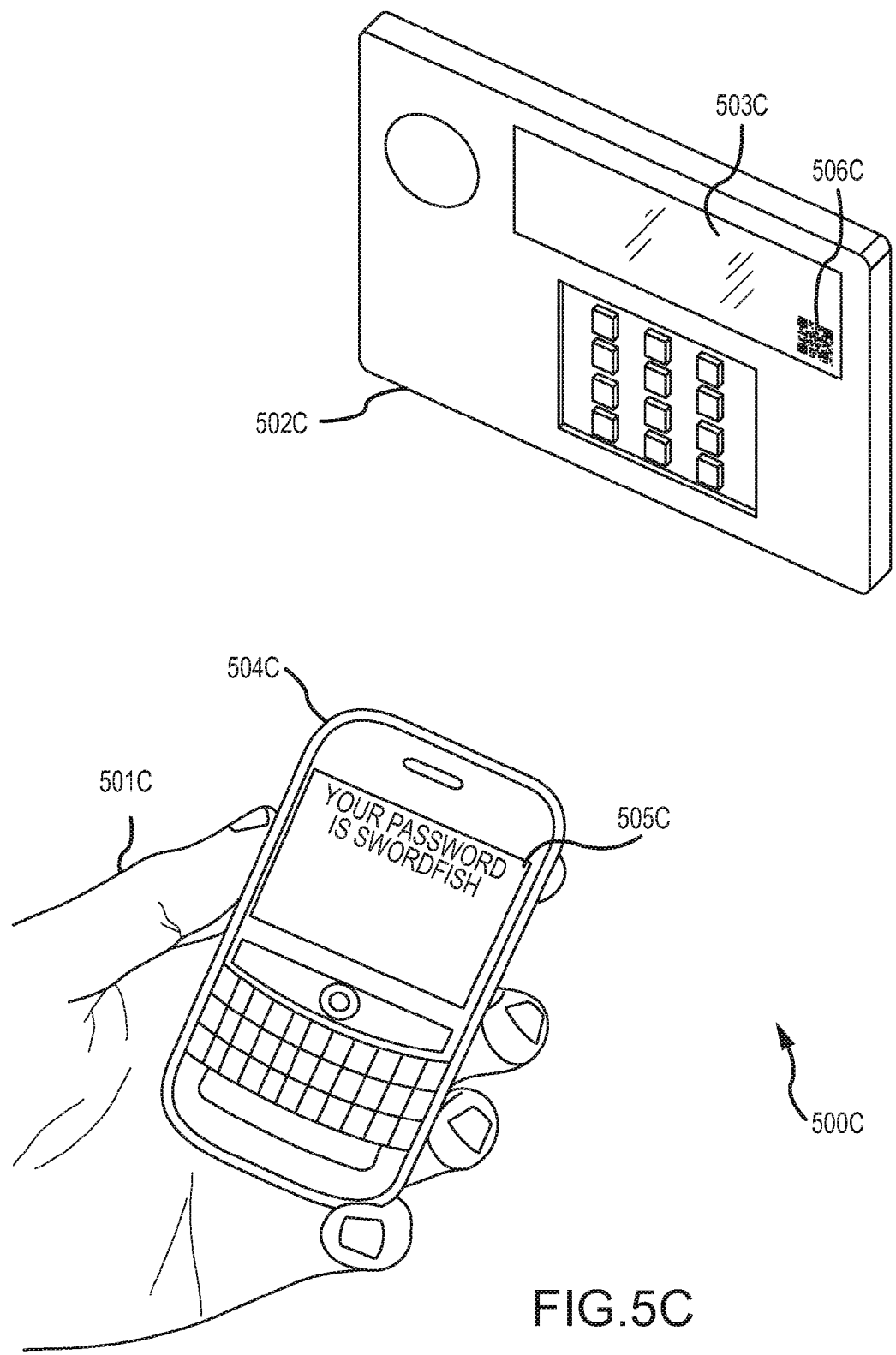

FIGS. 5A-5C illustrate a third example system 500A-500C that facilitates user support for a security system 502A-502C. As illustrated in FIG. 5A, the system 500A includes a security system 502A and a user 501A. In this example, the user may have forgotten a password stored by the security system and may have pressed a button for recovering the password. As such, the security system dynamically determines information specific to the security system which includes the password to recover, one or more passkey questions, and answers to the one or more passkey questions (any of which may be encrypted). The security system dynamically generates a QR code 506A that includes the dynamically determined information specific to the security system. Further, the security system includes user support information in the QR code identifying a password recovery program to initiate and supply with the information specific to the security system. The security system then displays the QR code on a control panel display screen 503A of the security system. In order to request user support, the user takes a picture of the QR code on the control panel display screen with a mobile computing device 504A that is executing a QR code reader program. The QR code reader program detects and decodes the QR code. Based on the decoded user support information, the mobile computing device initiates the password recovery program and passes the program the decoded information specific to the security system.

As illustrated in FIG. 5B, the password recovery program presents the user 501B with one or more of the passkey questions from the decoded information specific to the security system via a display screen 505B of the mobile computing device 504B, receives responses to the one or more passkey questions from the user, and compares the received answers to the decoded information specific to the security system. If the responses match the answers, the password recovery program presents the password to the user via the display screen 505C of the mobile computing device 504C, as illustrated in FIG. 5C.

FIG. 6 is a block diagram illustrating a system 600 for facilitating user support of an electronic device using matrix codes. The system 600 may include a electronic device 601 (which may be any kind of electronic device such as a television, a television receiver, a digital video recorder, a digital video disc player, an automobile, a computing device, a telephone, a kitchen appliance, a video game system, a security system, and so on), one or more display devices 602 (which may be any kind of display device such as a cathode ray tube display, a liquid crystal display, a television, a computer monitor, and so on), and a reader device 603 (which may be any kind of device capable of detecting and decoding a matrix code such as a telephone equipped with a camera, a mobile computing device that includes a camera, and so on). The system may also include one or more information servers 604 which may store and/or provide access to one or more sets of information related to resolution of error conditions, one or more references to sets of information related to resolution of error conditions (such as video, audio, text, and/or other media guides to resolving the error condition), and/or one or more matrix codes (such as one or more QR codes that may be scanned to access one or more sets of information related to resolution of error conditions).

The electronic device 601 may include one or more processing units 605, one or more one or more non-transitory storage media 606, and one or more communication components 607. Additionally, although the display device 102 is illustrated as separate from the electronic device, it is understood that in various implementations the display device may be incorporated into the electronic device. The processing unit of the electronic device may execute instructions stored in the non-transitory storage medium to detect that at least one error condition has occurred during the operation of the electronic device, select at least one matrix code to include in at least one error message based on the error condition, and transmit the error message (including the matrix code) to the display device utilizing the communication component.

Subsequently, the reader device 603 may detect and decode the matrix code displayed by the display device 602 and utilize information decoded from the matrix code to access and present one or more sets of information related to resolution of the error condition. For example, in cases where the electronic device 601 is a computer and the error condition relates to a failure to detect a hard drive, the information related to resolution of the error condition may be a video that demonstrates how to replace the hard drive of the computer. The reader device may include one or more processing units 609 which execute instructions stored in one or more non-transitory storage media 611 in order to perform the above described functions. As part of accessing the information related to resolution of the error condition, the reader device may retrieve the information from the non-transitory storage medium 611, retrieve the information from where it is stored and provided by the information server 604, and/or retrieve the information from another location where the information is stored. The reader device may also include an optical input device 610 (such as a camera, a barcode scanner, and so on) for detecting the matrix code displayed by the display device as well as a communication component 612 for communicating with the user support provider.

The information related to resolution the error condition may be a variety of different kind of information presented via a variety of different media. In some implementations the information related to resolution the error condition may be video (such as a YouTube™ video), audio, text, and/or other media step by step presentation of a procedure to resolve the error condition.

In various implementations, the reader device 603 may prompt for a set of login information (such as one or more login identifiers, passwords, security certificates, security tokens, and/or other information utilized to authenticate a login) prior to presenting the set of information related to resolution of the error condition. The reader device may prompt for such login information based on information decoded from the matrix code. In such cases, the reader device may require login information prior to presenting the set of information related to resolution of the error condition to restrict access to technical support personnel, users who have subscribed to a support service, registered users, and so on.

In some implementations, the electronic device 601 may select the matrix code to include in the error message by dynamically generating the matrix code upon the detection of the error condition. For example, in situations where the electronic device is a set top box and a failure to connect to a programming source is detected, the electronic device may generate a matrix code utilizing one or more references to information related to resolution of failure to detect programming sources. In such cases, the reference may have been obtained from the information server 604, which may be maintained by a programming provider associated with the set top box, and stored in the non-transitory storage medium 606.

Further, in such implementations, the electronic device may include various information specific to the electronic device in the generated matrix code. For example, the electronic device may include: electronic device identifiers (such as network addresses, serial numbers, media access control numbers, and so on), electronic device configuration information (such as the individual hardware components included in the electronic device and/or identifiers for such components, drivers utilized on the electronic device, options set for the electronic device, a current status of the electronic device, and so on), error codes for errors that have occurred during electronic device operation (such as an error number associated with an error that has occurred, debug information, a core dump, and so on), account information for one or more customer accounts (such as subscription service accounts, warrantee accounts, support agreement accounts, and so on) associated with the electronic device, a location of the electronic device (such as a global positioning system location, a mailing address, and so on), and so on. The reader device 603 may utilize the information specific to the electronic device to select among one or more sets of information related to resolution of the error condition, confirm authorization to present the information, and so on.

In other implementations, the electronic device 601 may store a number of matrix codes related to different error conditions in the non-transitory storage medium 606. Such matrix codes may have been obtained from the information server 604, which may be maintained by a support provider associated with the electronic device (such as a service provider associated with the electronic device). When the processing unit 605 detects an error condition, the processing unit 605 may select a matrix code that corresponds to the error condition (such as utilizing a lookup table that maintains correspondences between error conditions and matrix codes). For example, in cases where the electronic device is an electric range and the electric range detects that a heating element has failed to heat, the electronic range may consult a lookup table of correspondences between error conditions and matrix codes to select a matrix code related to failed heating elements.

In various implementations, after the processing unit 605 transmits the error message (including the matrix code) to the display device 602 utilizing the communication component 607, the processing unit may determine that the information regarding the resolution of the error condition has been utilized to unsuccessfully attempt to resolve the error condition. The processing unit may determine that the information regarding the resolution of the error condition has been utilized to unsuccessfully attempt to resolve the error condition by: monitoring the operation of the electronic device 601 to ascertain whether operations included in the information have been performed, receiving one or more indications that one or more resolution attempts utilizing the information have been unsuccessful from the reader device 603, receiving one or more indications that one or more resolution attempts utilizing the information have been unsuccessful from one or more user interfaces (not shown) of the electronic device (such as one or more remotes, buttons, touch screens, and/or other user interface components), and/or other such ways of determining that the information regarding the resolution of the error condition has been utilized to unsuccessfully attempt to resolve the error condition. If the processing unit 605 determines that the information regarding the resolution of the error condition has been utilized to unsuccessfully attempt to resolve the error condition, the processing unit may select one or more additional matrix codes to transmit to the display device 602 via the communication component 607.

In some cases, the reader device 603 may detect and decode the additional matrix code displayed by the display device and utilize information decoded from the matrix code to access and present one or more sets of additional information related to resolution of the error condition. For example, in situations where the electronic device is an automobile that has detected a low power error condition, the automobile may display a matrix code that may be scanned by a smart phone to present a video demonstrating how to verify that battery cables are properly secured. The video may include a prompt for a user to indicate whether the user has successfully or unsuccessfully resolved the low power error condition utilizing the video. If the user indicates that he has unsuccessfully resolved the low power error condition utilizing the video, the smart phone may transmit such to the automobile which may then display an additional matrix code. The additional matrix code may be scanned by the smart phone to present a different video that demonstrates how to replace the battery.

In such cases, the reader device 603 may prompt for a set of login information (such as one or more login identifiers, passwords, security certificates, security tokens, and/or other information utilized to authenticate a login) prior to presenting the additional set of information related to resolution of the error condition. The reader device may prompt for such login information based on information decoded from the additional matrix code. In such cases, the reader device may require login information prior to presenting the set of additional information related to resolution of the error condition to restrict access to technical support personnel, users who have subscribed to a support service, registered users, and so on.

In other cases, the reader device 603 may detect and decode the additional matrix code displayed by the display device and utilize information decoded from the additional matrix code to initiate one or more electronic device support requests. In some implementations, the electronic device 601 may have selected the additional matrix code that is decodable to initiate the electronic device support request as opposed to a different matrix code decodable to access and/or present a set additional information related to resolution of the error condition. The electronic device may have performed this selection in response to: receiving an input from a user (such as via the reader device, an input component associated with the electronic device, and so on) indicating that the user does not wish to perform additional attempts to resolve the error condition, determining that a threshold number (such as three) of attempts to resolve the error condition have been performed, determining that a set of additional information regarding resolution of the error condition is not available, and/or similar conditions.

Figure 7:
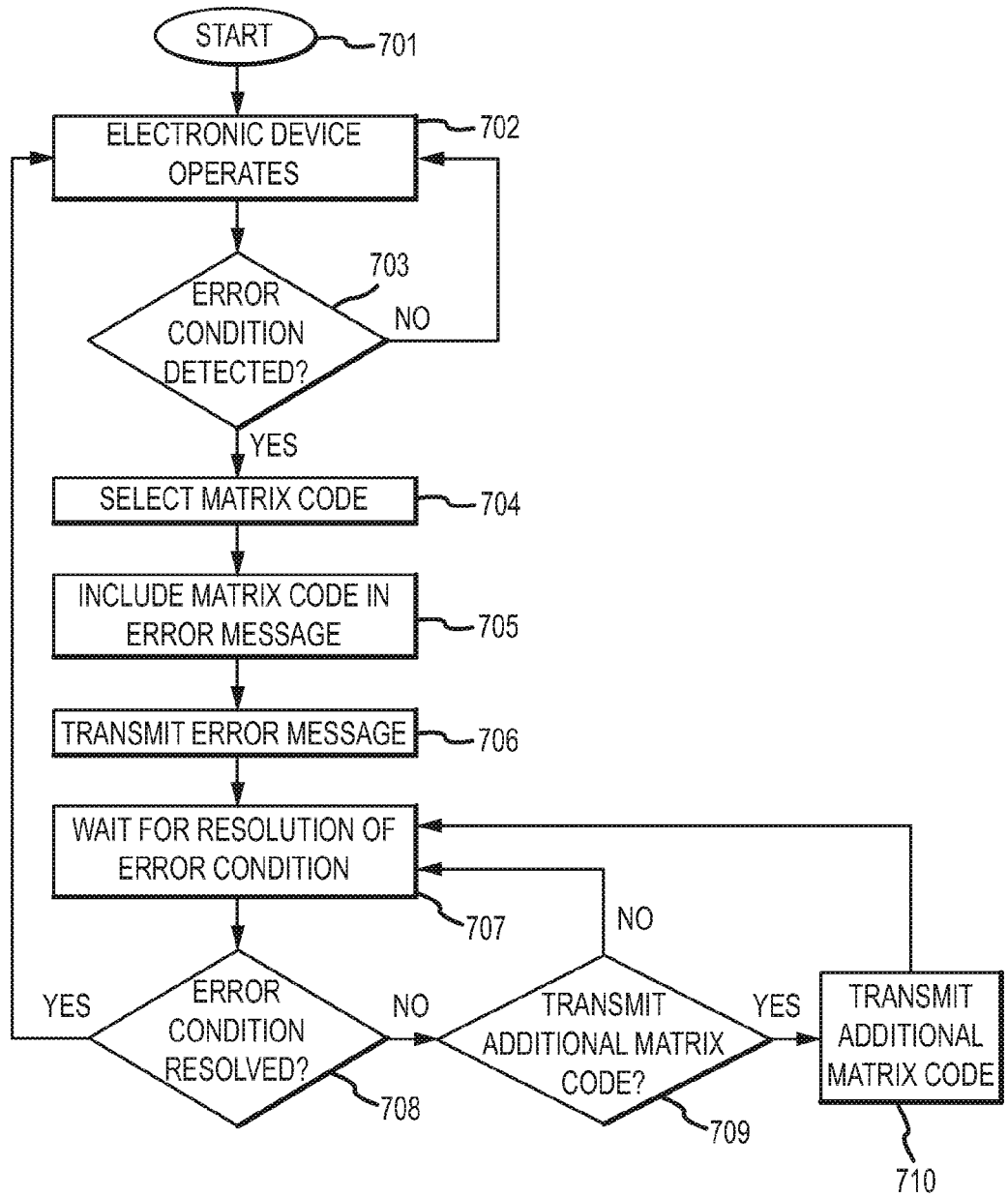
FIG. 7 is a flow chart illustrating a method for facilitating user support of an electronic device using matrix codes. This method may be performed by the system of FIG. 6.

FIG. 7 illustrates a method 700 for facilitating user support of an electronic device using matrix codes. The method 700 may be performed by the system 600 of FIG. 6. The flow begins at block 701 and proceeds to block 702 where the electronic device 601 operates. The flow then proceeds to block 703 where the electronic device determines whether or not an error condition has been detected. If not, the flow returns to block 702 where the electronic device continues to operate. Otherwise, the flow proceeds to block 704.

At block 704, after the electronic device 601 determines that an error condition has been detected, the electronic device selects a matrix code based on the detected error condition. In some cases, the electronic device may select the matrix code based on the error condition by selecting an error code stored by the electronic device, such as by utilizing a table of correspondences between error conditions and stored matrix codes. In other cases, the electronic device may generate the matrix code dynamically. In these other cases the electronic device may include information specific to the electronic device in the dynamically generated matrix code. The flow then proceeds to block 705 where the electronic device includes the matrix code in an error message. Next, the flow proceeds to block 706 where the electronic device transmits the error message to a display device 602 before the flow proceeds to block 707. The matrix code included in the error message displayed on the display device may be scanned and decoded by the reader device 603 in order to access and present information related to resolution of the error condition.

At block 707, the electronic device 601 waits for resolution of the error condition and the flow proceeds to block 708. At block 708, the electronic device determines whether or not the error condition is resolved. If so, the flow returns to block 702 and the electronic device continues to operate. Otherwise, the flow proceeds to block 709.

At block 709, after the electronic device 601 determines that the error condition is not resolved, the electronic device determines whether or not to transmit an additional matrix code. In some cases, the electronic device may determine to transmit an additional matrix code if the electronic device determines that an attempt to resolve the error condition utilizing information presented in association with a previously transmitted matrix code is unsuccessful. If not, the flow returns to block 707 and the electronic device continues to wait for resolution of the error condition. Otherwise, the flow proceeds to block 710.

At block 710, after the electronic device 601 determines to transmit an additional matrix code, the electronic device selects and transmits the additional matrix code to the display device 602. The additional matrix code displayed on the display device may be scanned and decoded by the reader device 603 in order to access and present additional information related to resolution of the error condition, to initiate an electronic device support request, and/or perform similar operations. The flow then returns to block 707 and the electronic device continues to wait for resolution of the error condition.

Figure 8B:
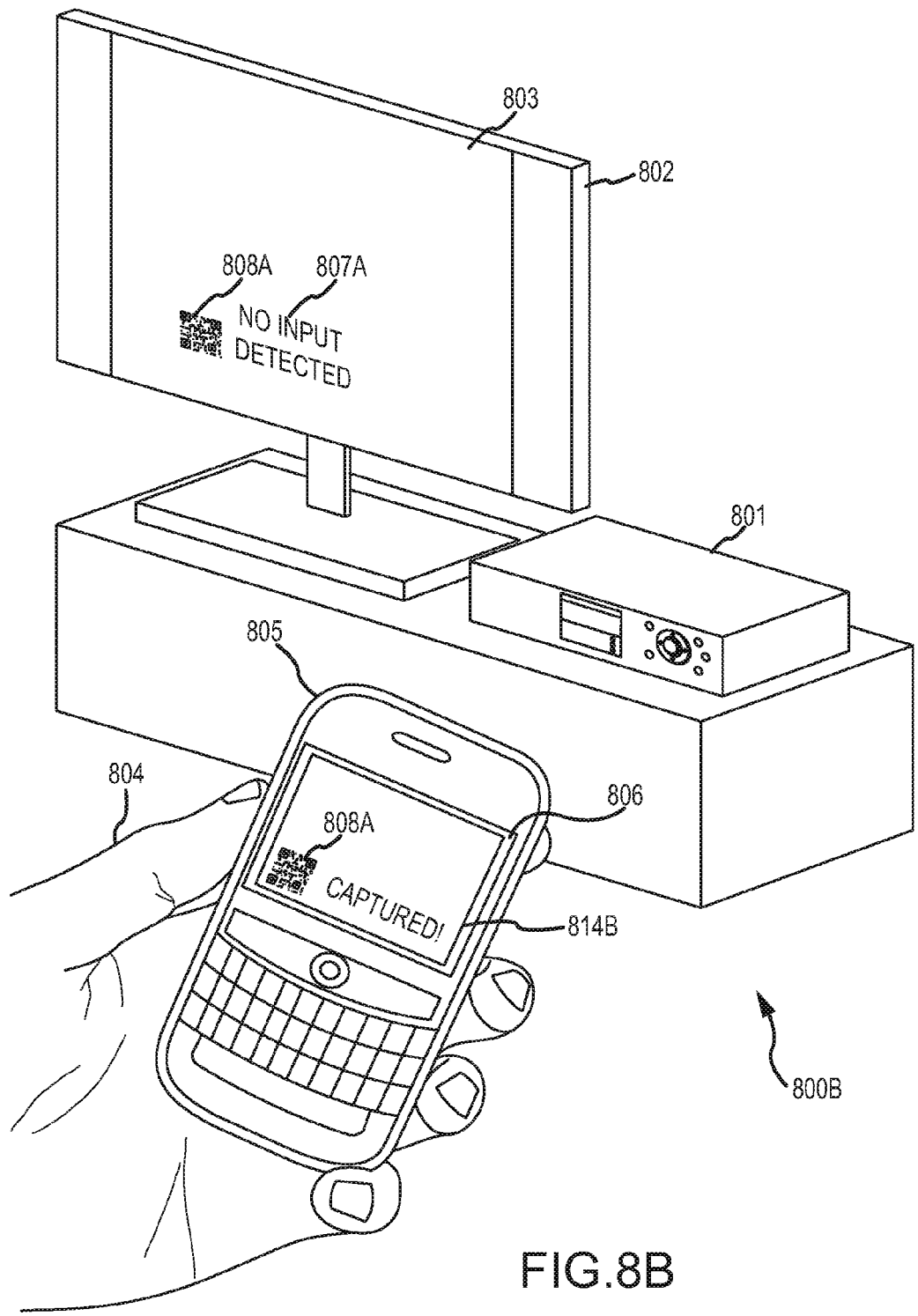

FIGS. 8A-8I illustrate an example system 800a-800i that facilitates user 804 support for a set top box 801 utilizing matrix codes. The system may be the system of FIG. 6. As illustrated in FIG. 8A, the system 800A includes user 804 watching a television 802 that displays content received from a set top box 801 on a television screen 803 and a user 301A. In this example, the set top box may detect an error condition relating to the fact that it is not receiving an input to display on the television screen. As such, the set top box may select a QR code 808a that corresponds to a "no input detected" error condition, include the QR code 808a in an error message 807a corresponding to the "no input detected" error condition, and transmit the error message 807a to the television to be displayed on the television screen.

Figure 8C:
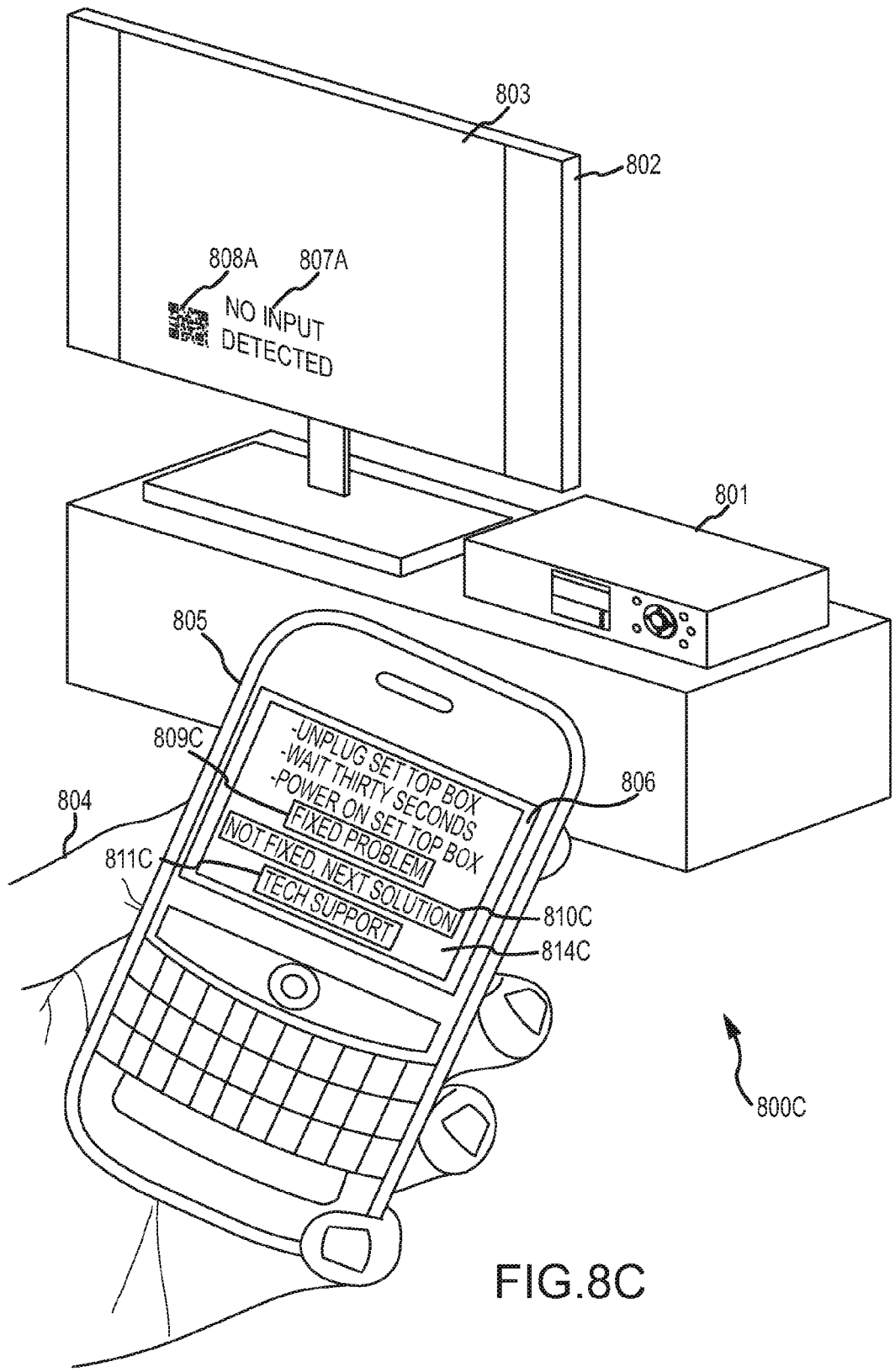

As shown in FIG. 8B, the user 804 may utilize a smart phone 805 to scan the QR code 808a, which may display a confirmation of the capture of the QR code 808a in a window 814b on a smart phone screen 806. As shown in FIG. 8C, the smart phone may then decode the QR code 808a to present information regarding resolution of the "no input detected" error condition in a window 814c on the smart phone screen. In this example the information includes a list of text instructions specifying for the user to: "—Unplug the set top box," "—Wait thirty seconds," and "—Power on set top box."

As also shown, the window 814c may include selection elements prompting the user 804 to indicate whether the error condition is resolved 809c, whether the error condition is not resolved and to provide another matrix code related to another set of information regarding resolution of the "no input detected" error condition 810c, or whether the error condition is not resolved and to initiate a technical support request 811c.

If the user 804 selects the selection element indicating that the error condition is resolved 809c, the smart phone 805 may close the window 814c and may transmit a message to the set top box 801 to stop displaying the error message 807a displayed on the television screen 803.

Figure 8E:
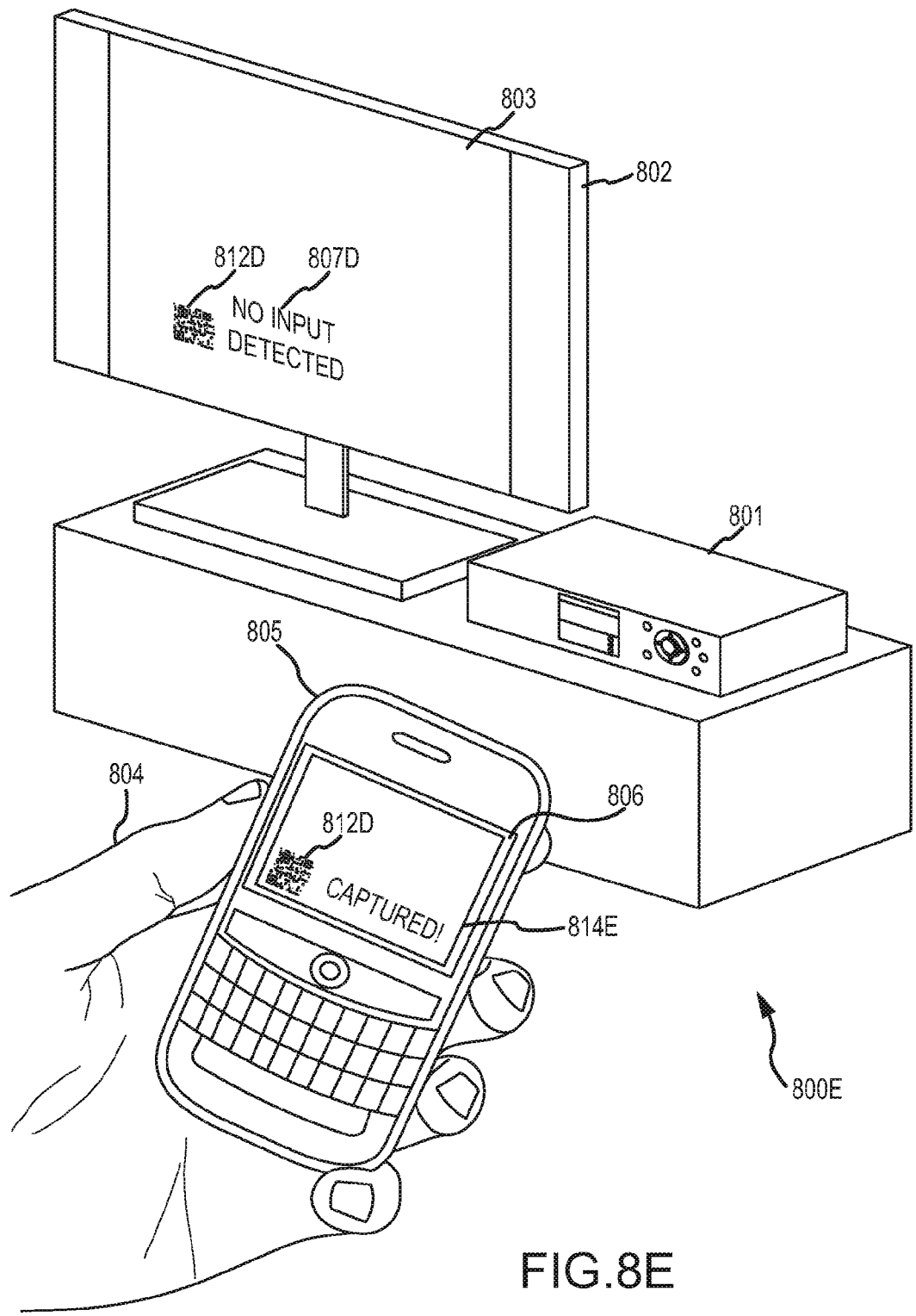

However, if the user 804 selects the selection element indicating that the error condition is not resolved and to provide another matrix code related to another set of information regarding resolution of the "no input detected" error condition 810c, the smart phone 805 may transmit a message to the set top box 801 (as illustrated in FIG. 8D) to select an additional QR code 812d and display the additional QR code 812d on the television screen 803. As shown in FIG. 8E, the user 804 may utilize the smart phone 805 to scan the QR code 812d, which may display a confirmation of the capture of the QR code 812d in a window 814e on the smart phone screen 806.

Figure 8F:
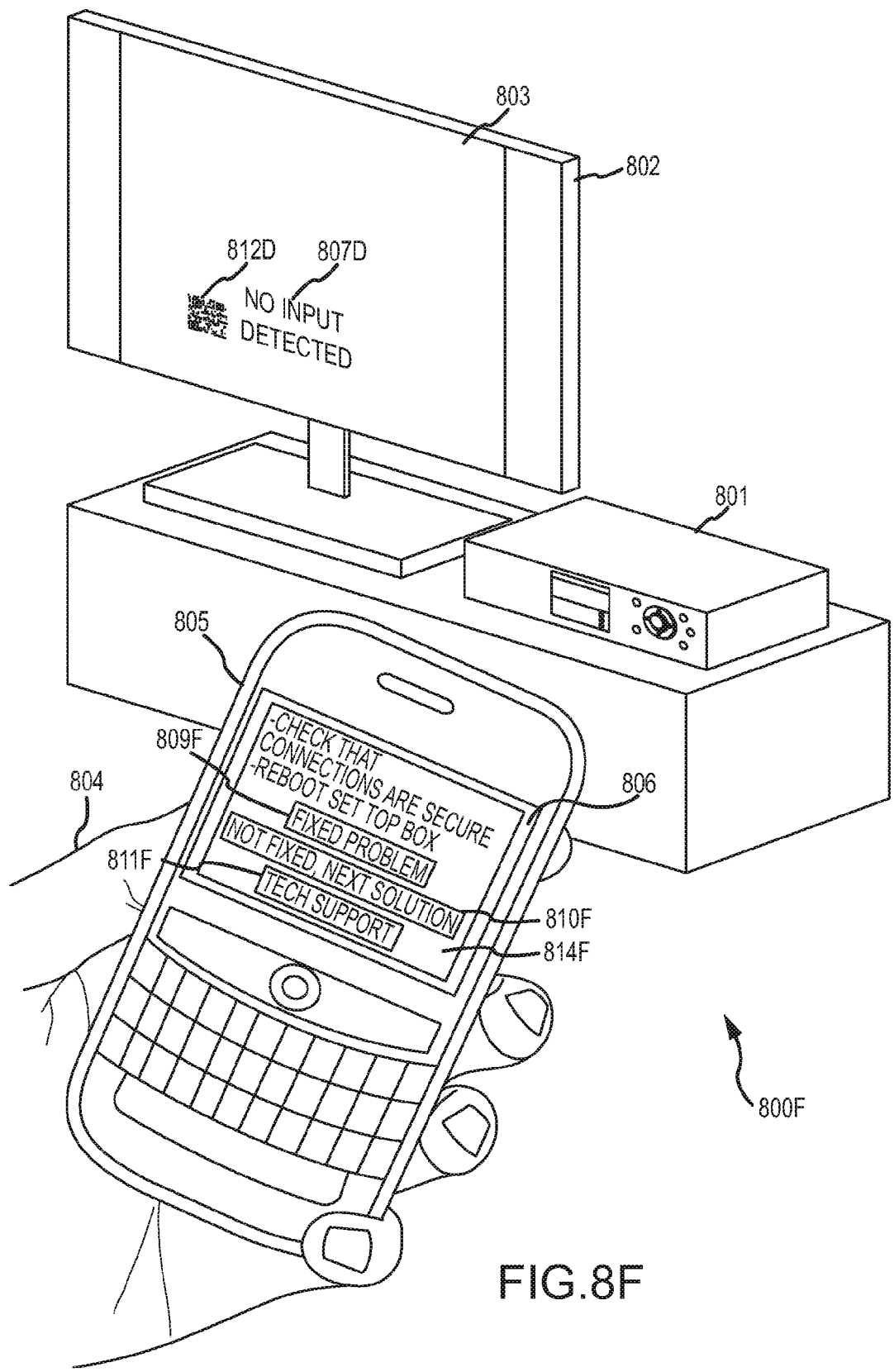

As shown in FIG. 8F, the smart phone may then decode the QR code 812d to present additional information regarding resolution of the "no input detected" error condition in a window 814f on the smart phone screen. In this example the information includes a list of text instructions specifying for the user to: "—Unplug the set top box," "—Wait thirty seconds," and "—Power on set top box." As also shown, the window 814f may include selection elements prompting the user 804 to indicate whether the error condition is resolved 809f, whether the error condition is not resolved and to provide another matrix code related to another set of information regarding resolution of the "no input detected" error condition 810f, or whether the error condition is not resolved and to initiate a technical support request 811f.

Figure 8H:
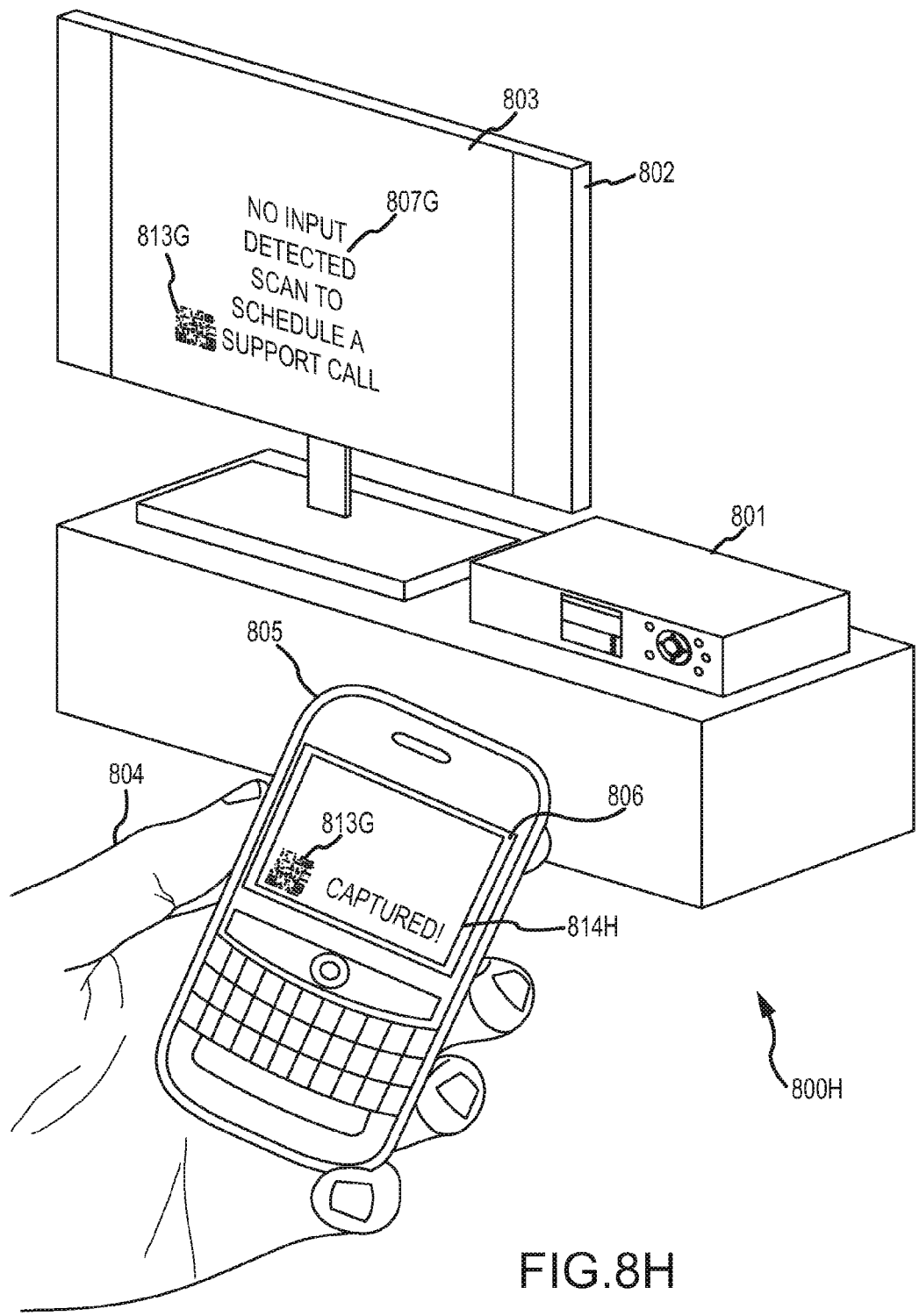
Figure 8I:
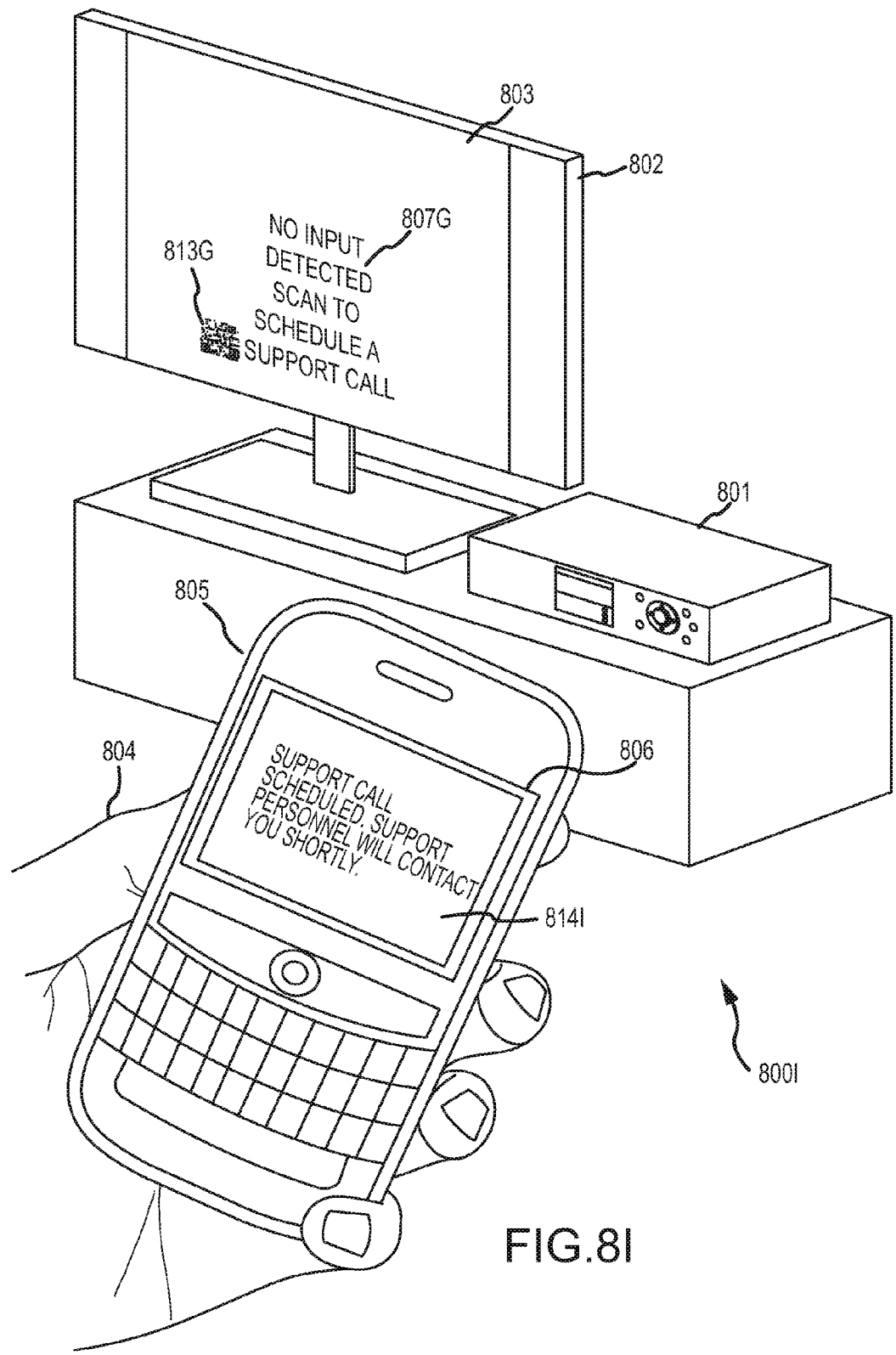

If the user 804 selects the selection element indicating to initiate a technical support request 811f, the smart phone 805 may (as illustrated in FIG. 8G) transmit a message to the set top box 801 to select a QR code 813g and display it on the television screen 803. As shown in FIG. 8H, the user 804 may utilize the smart phone 805 to scan the QR code 813g, which may display a confirmation of the capture of the QR code 813g in a window 814g on the smart phone screen 806. As shown in FIG. 8I, the smart phone may then decode the QR code 813g to present a support call confirmation message indicating that a support call has been scheduled in a window 814i on the smart phone screen.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for facilitating user support of electronic devices, the method comprising:
   detecting, utilizing an electronic device, at least one error condition relating to the operation of the electronic device, wherein the electronic device is selected from the group consisting of a television, a television receiver, a digital video recorder, a digital video disc player, an automobile, a personal computer, a telephone, a kitchen appliance, a video game system, and a security system;
   selecting, utilizing the electronic device, at least one matrix code to include in at least one error message, wherein the selected matrix code includes encoded information related to the at least one error condition;
   transmitting, utilizing the electronic device, the at least one error message to at least one display device wherein the at least one matrix code in the error message is displayed on the display device and is decodable by at least one reader device that optically detects the at least one matrix code included in the at least one error message displayed on the at least one display device to present information regarding resolution of the at least one error condition;
   determining, utilizing the at least one electronic device, that the information regarding resolution of the at least one error condition did not successfully resolve the at least one error condition; and
   transmitting, utilizing the at least one electronic device, at least one additional matrix code to the at least one display device, wherein the at least one additional matrix code includes information different from or in addition to information included in the information regarding resolution of the at least one error condition.

2. The method of claim 1, wherein said operation of selecting, utilizing the electronic device, at least one matrix code to include at least one error message based on the at least one error condition further comprises generating the at least one matrix code utilizing the electronic device.

3. The method of claim 2, wherein said operation of generating the at least one matrix code utilizing the electronic device further comprises including information specific to the electronic device in the at least one matrix code.

4. The method of claim 1, wherein the at least one additional matrix code is decodable by the at least one reader device that optically detects the at least one matrix code displayed on the at least one display device to present at least one additional set of information regarding resolution of the at least one error condition.

5. The method of claim 4, wherein the at least one reader device prompts for at least one set of login information prior to presenting the at least one additional set of information regarding resolution of the at least one error condition.

6. The method of claim 1, wherein the at least one additional matrix code is decodable by the at least one reader device that optically detects the at least one matrix code displayed on the at least one display device to initiate an electronic device user support request.

7. The method of claim 6, wherein said operation of transmitting, utilizing the at least one electronic device, at least one additional matrix code to the at least one display device is performed in response to at least one of receiving user input indicating that the user does not want at least one additional set of information regarding resolution of the at least one error condition, determining the at least one additional set of information regarding resolution of the at least one error condition is not available, or determining that a threshold number of matrix codes already been provided based on the at least one error condition.

8. The method of claim 1, wherein said operation of determining, utilizing the at least one electronic device, that the information regarding resolution of the at least one error condition did not successfully resolve the at least one error condition further comprises at least one of:
  monitoring, utilizing the electronic device, at least one operating of the electronic device to determine if the information regarding resolution of the at least one error condition has been utilized to resolve the at least one error condition, or
  receiving at least one input at the electronic device from at least one of at least one user interface of the electronic device or the at least one reader device, wherein the at least one input indicates that the information regarding resolution of at least one error condition and the at least one error condition is not resolved.

9. A system, comprising:
  at least one electronic device selected from the group consisting of a television, a television receiver, a digital video recorder, a digital video disc player, an automobile, a personal computer, a telephone, a kitchen appliance, a video game system, and a security system, comprising:
  at least one electronic device processing unit that detects at least one error condition relating to the operation of the electronic device and selects at least two matrix codes to include in at least two error messages based on the at least one error condition, wherein the selected matrix code includes encoded information related to the at least one error condition, and wherein the second of the at least two matrix codes is performed in response to at least one of receiving user input indicating that the user does not want at least one additional set of information regarding resolution of the at least one error condition, determining that additional information regarding resolution of the at least one error condition is not available, or determining that a threshold number of matrix codes already been provided based on the at least one error condition; and
  at least one electronic device output component that transmits the at least one error message to at least one display device that displays the selected matrix code, and
  at least one reader device, comprising:
  at least one reader device optical detector that detects the at least one matrix code included in the at least one error message displayed on the at least one display device; and
  at least one reader device processing unit that decodes the at least one matrix code detected by the at least one reader device optical detector to present information regarding resolution of the at least one error condition.

10. The system of claim 9, wherein the at least one electronic device processing unit determines that the information included in the first of the at least two matrix codes regarding resolution of the at least one error condition did not successfully resolve the at least one error condition.

11. The system of claim 10, wherein the at least one reader device processing unit decodes the second of the at least two matrix codes detected by the at least one reader device optical detector to present at least one additional set of information regarding resolution of the at least one error condition.

12. The system of claim 11, wherein the at least one reader device processing unit prompts for at least one set of login information prior to presenting the at least one additional set of information regarding resolution of the at least one error condition.

13. The system of claim 10, wherein the at least one reader device processing unit decodes the second of the at least two matrix codes detected by the at least one reader device optical detector to initiate an electronic device user support request.

14. The system of claim 13, wherein the at least one electronic device processing unit transmits the second of the at least two matrix codes to the at least one display device via the at least one electronic device output component in response to at least one of:
  receiving user input indicating that the user does not want at least one additional set of information regarding resolution of the at least one error condition; or
  determining the at least one additional set of information regarding resolution of the at least one error condition is not available.

15. The system of claim 10, wherein the at least one electronic device processing unit determines that the information regarding resolution of the at least one error condition did not successfully resolve the at least one error condition by at least one of:
  monitoring at least one operation of the electronic device to determine if the information regarding resolution of the at least one error condition has been utilized to resolve the at least one error condition, or
  receiving at least one input from at least one user interface of the electronic device or the at least one reader device, wherein the at least one input indicates that the information regarding resolution of the at least one error condition has been utilized to attempt to resolve the at least one error condition and the at least one error condition is not resolved.

16. The system of claim 9, wherein the at least one electronic device processing unit selects the at least one matrix code by generating the at least one matrix code.

17. The system of claim 16, wherein the at least one electronic device processing unit includes information specific to the electronic device in the at least one matrix code.

18. An electronic device selected from the group consisting of a television, a television receiver, a digital video recorder, a digital video disc player, an automobile, a personal computer, a telephone, a kitchen appliance, a video game system, and a security system, comprising:
  at least one processing unit that detects at least one error condition relating to the operation of the electronic device and selects at least two matrix codes to include in at least two error messages, wherein the selected matrix code includes encoded information related to the at least one error condition, and wherein the second of the at least two matrix codes is performed in response to at least one of receiving user input indicating that the user does not want at least one additional set of information regarding resolution of the at least one error condition, determining that additional information regarding resolution of the at least one error condition is not available, or determining that a threshold number of matrix codes already been provided based on the at least one error condition; and
  at least one output component, communicably coupled to the at least one processing unit, that transmits the at least one error message to at least one display device that displays the matrix code;

wherein the at least one matrix code is decodable by at least one reader device that optically detects the at least one matrix code included in the at least one error message displayed on the at least one display device to present information regarding resolution of the at least one error condition.

19. The electronic device of claim 18, wherein the at least one matrix code comprises at least one QR code.

\* \* \* \* \*